(12) United States Patent
Kamiya

(10) Patent No.: US 8,996,991 B2
(45) Date of Patent: Mar. 31, 2015

(54) SYSTEM AND METHOD FOR DISPLAYING AN ACCEPTANCE STATUS

(75) Inventor: Takuki Kamiya, Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 3276 days.

(21) Appl. No.: 11/056,441

(22) Filed: Feb. 11, 2005

(65) Prior Publication Data
US 2006/0184874 A1 Aug. 17, 2006

(51) Int. Cl.
*G06F 17/00* (2006.01)
*G06F 17/27* (2006.01)
*G06F 17/22* (2006.01)

(52) U.S. Cl.
CPC ........ *G06F 17/2725* (2013.01); *G06F 17/2247* (2013.01)
USPC .......................................... 715/249; 715/225

(58) Field of Classification Search
USPC .................. 715/224, 225, 226, 243, 249, 267
See application file for complete search history.

(56) References Cited

U.S. PATENT DOCUMENTS

| | | | | |
|---|---|---|---|---|
| 6,041,324 A * | 3/2000 | Earl et al. | ........................... | 707/9 |
| 6,763,500 B2 | 7/2004 | Black et al. | .................... | 715/513 |
| 6,912,538 B2 | 6/2005 | Stapel et al. | .................. | 707/101 |
| 7,117,504 B2 * | 10/2006 | Smith et al. | .................... | 719/328 |
| 7,287,229 B2 * | 10/2007 | Forkner et al. | ................. | 715/762 |
| 2003/0189585 A1 * | 10/2003 | Forkner et al. | ................. | 345/700 |
| 2004/0002952 A1 | 1/2004 | Lee et al. | ........................... | 707/1 |
| 2004/0006744 A1 | 1/2004 | Jones et al. | ................... | 715/514 |
| 2004/0027326 A1 * | 2/2004 | Hays et al. | ..................... | 345/106 |
| 2004/0073870 A1 | 4/2004 | Fuh et al. | ....................... | 715/513 |
| 2005/0039166 A1 | 2/2005 | Betts et al. | ..................... | 717/114 |
| 2005/0060317 A1 | 3/2005 | Lott et al. | ......................... | 707/10 |
| 2005/0060645 A1 | 3/2005 | Raghavachari et al. | ...... | 715/513 |
| 2006/0136808 A1 * | 6/2006 | Chirilov et al. | ............... | 715/503 |

OTHER PUBLICATIONS

Ahoerstemeier et al., Node (Computer Science), Aug. 12, 2010, Wikipedia, 2 pages.*
Aho et al., Parsing, Aug. 12, 2010, Wikipedia, 6 pages.*
"Bin-XML™ in Ten Points," *EXPWAY,* http://www.expway.com/telechargement/1105636681.pdf, date unknown, 4 pages.
Hartmut Liefke, Dan Suciu, "XMill: an Efficient Compressor for XML Data," *University of Washington, Computer Science and Technology,* http://www.cs.washington.edu/homes/suciu/xmill.ps, date unknown, 26 pages.
"WAP Binary XML Content Format," *Wireless Application Forum Ltd.,* W3C® World Wide Web Consortium, http://www.w3.org/TR/xbxml/, Jun. 24, 1999, 22 pages.

(Continued)

*Primary Examiner* — Stephen Hong
*Assistant Examiner* — Gregory J Vaughn
(74) *Attorney, Agent, or Firm* — Baker Botts L.L.P.

(57) ABSTRACT

A method of parsing a markup-language document includes detecting, in a markup-language document, a start of a first data node of a first node type and identifying a first data definition associated with the first node type. The first data definition specifies defined contents of the first node type. The method further includes adding a first entry associated with the first data node to a data structure and reading, from the markup-language document, contents of the first data node. The method also includes determining a status of the first data node based on the first data definition and the contents read from the first data node and indicating the status of the first data node on a graphical user interface.

24 Claims, 12 Drawing Sheets

(56) References Cited

OTHER PUBLICATIONS

Marc Girardot, Neel Sundaresan, "Millau: an encoding format for efficient representation and exchange of XML over the Web," *9th International World Wide Web Conference,* May 2000, http://www9.org/w9cdrom/154/154.html, 25 pages.

Rakesh Agrawal, Roberto J. Bayardo Jr., Daniel Gruhl, Spiros Papadimitriou, "Vinci: A Service-Oriented Architecture for Rapid Development of Web Applications," *Tenth International World Wide Web Conference,* http://www10.org/cdrom/papers/506/, May 2001, 22 pages.

"Expat Development Roadmap," *eXpat,* http://expat.sourceforge.net/dev/roadmap.html, Sep. 5, 2002, 5 pages.

U.S. Appl. No. 11/056,432, entitled "Determining an Acceptance Status During Document Parsing," filed Feb. 11, 2005, 75 pages.

U.S. Appl. No. 11/056,524, entitled "Method and System for Decoding Encoded Documents," filed Feb. 11, 2005, 73 pages.

U.S. Appl. No. 11/056,440, entitled "Method and System for Reducing Delimiters," filed Feb. 11, 2005, 78 page.

U.S. Appl. No. 11/056,996, entitled "Method and System for Fast Encoding of Data Documents," filed Feb. 11, 2005, 72 pages.

U.S. Appl. No. 11/056,920, entitled "Method and System for Compiling Schema," filed Feb. 11, 2005, 75 pages.

U.S. Appl. No. 11/057,021, entitled "Method and System for Sequentially Accessing Compiled Schema," filed Feb. 11, 2005, 72 pages.

\* cited by examiner

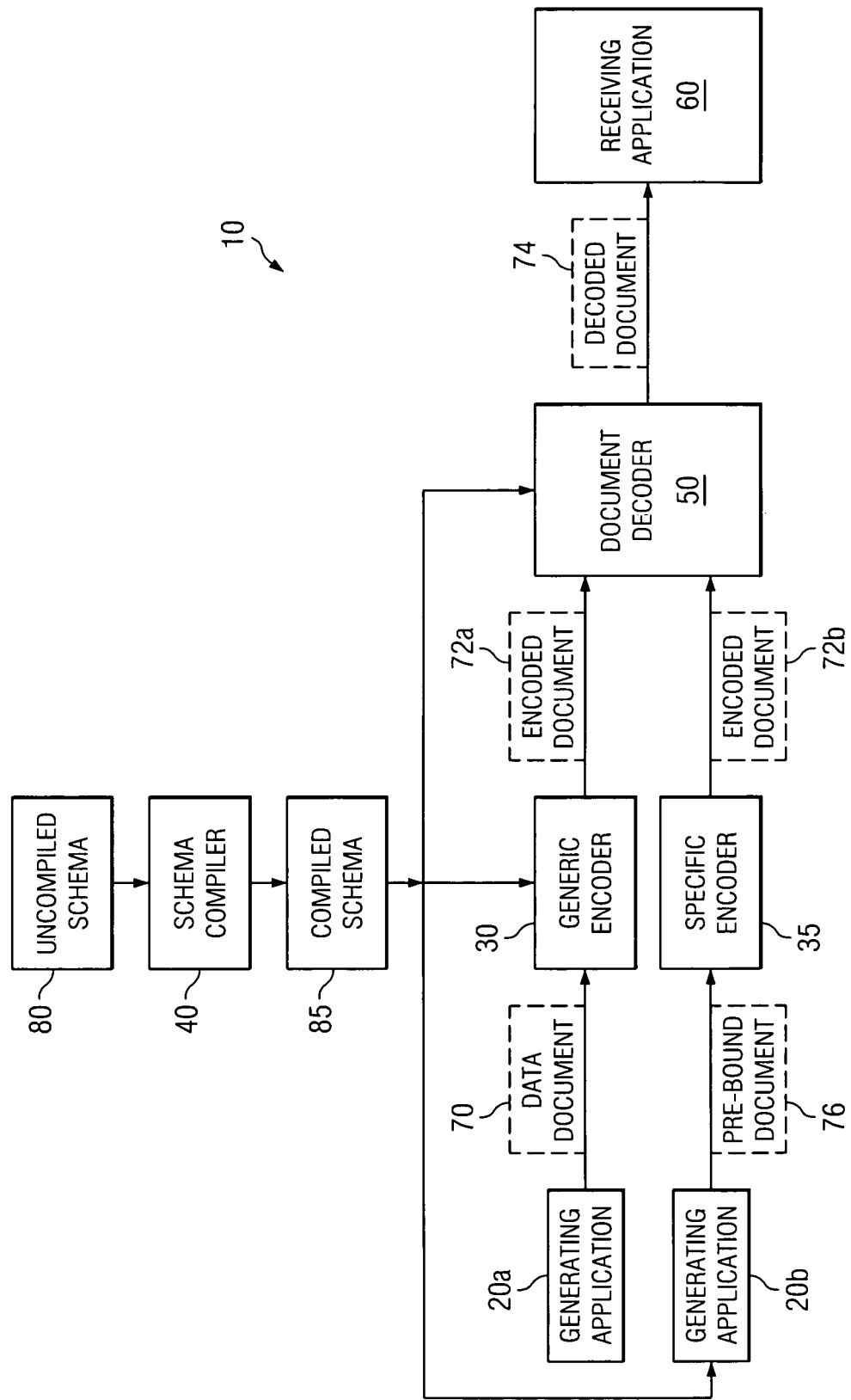

FIG. 2A

```
<xs:element name="BOOK" type="BookType"/>                                    ⌐ 210a <xs:complexType name="BookType">                                             ⌐ 210b <xs:attribute name="LINK" type="xs:anyURI"                                 ⌐ 210c
                use="required"/>

<xs:sequence>                                                              ⌐ 210d <xs:element name="TITLE" type="xs:string"                                ⌐ 210e
                minOccurs="1" maxOccurs="1"/>

<xs:choice>
      <xs:element name="AUTHOR" type="xs:PersonType"/>                       ⌐ 210i
      <xs:element name="EDITOR" type="xs:PersonType"/>                       ⌐ 210j
    </xs:choice>

<xs:element name="PUBLISHER" type="xs:string"                            ⌐ 210g
                minOccurs="0" maxOccurs="1"/>

<xs:element name="YEAR" type="xs:gYear"                                  ⌐ 210h
                minOccurs="1" maxOccurs="1"/>

</xs:sequence>

</xs:complexType>
```

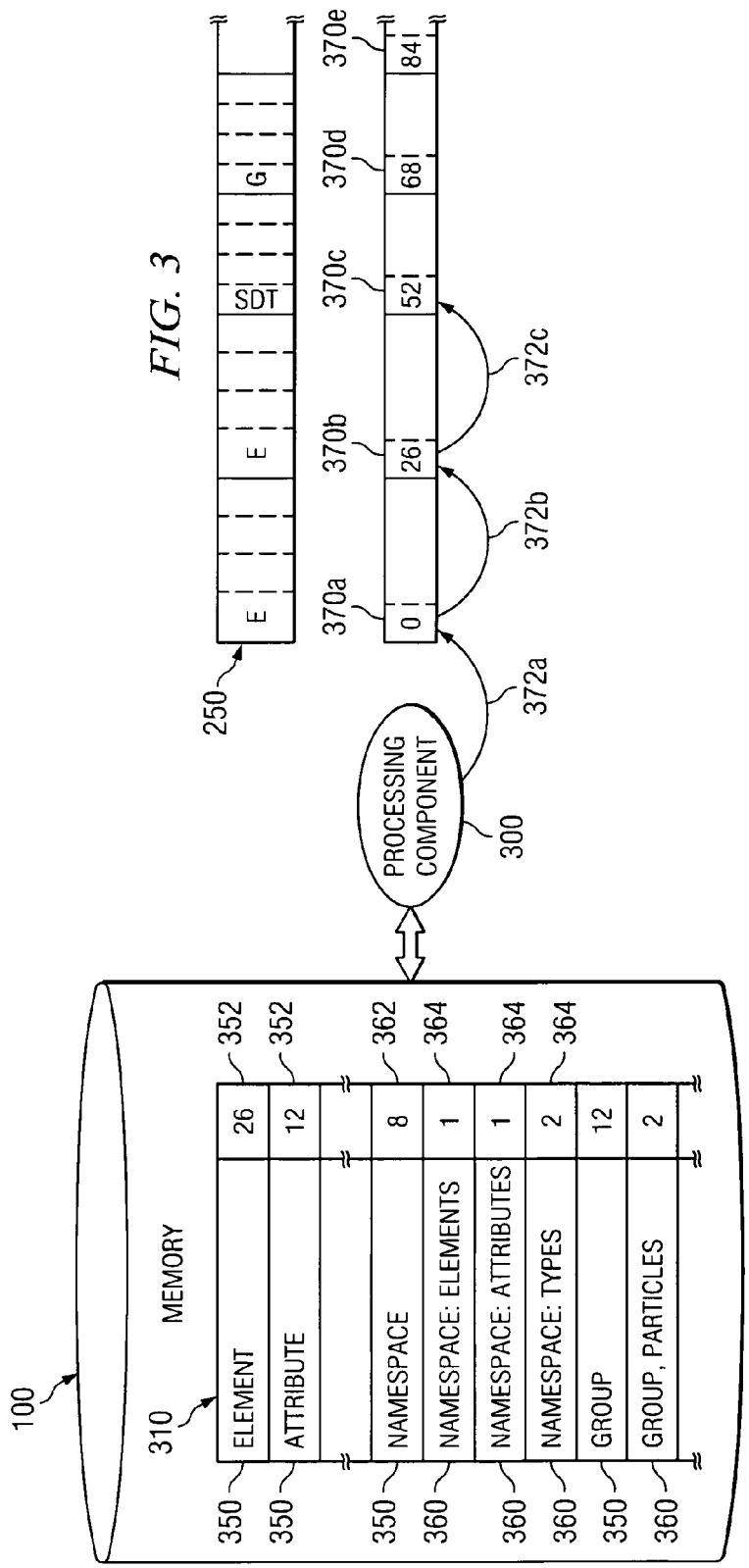
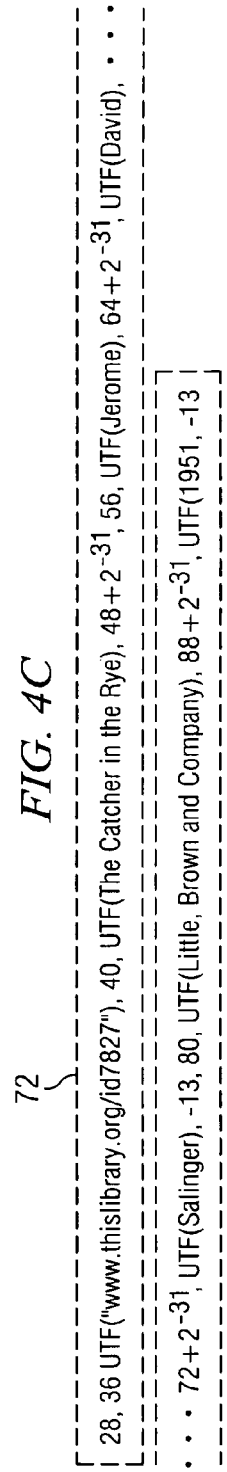
FIG. 3
FIG. 4C

SYSTEM AND METHOD FOR DISPLAYING AN ACCEPTANCE STATUS

TECHNICAL FIELD OF THE INVENTION

This invention relates in general to data processing systems and, more particularly, to encoding and decoding markup-language documents.

BACKGROUND OF THE INVENTION

In recent years, the introduction and development of eXtensible Markup Language ("XML") and other data-describing markup languages have led to a plethora of applications developed to utilize the flexibility and extensibility of XML and other such markup languages. A wide variety of systems have evolved that are capable of leveraging the advantages of extensible data-describing languages including, for example, e-commerce networks, mobile communication devices, personal data devices, and database systems. Because many systems developed to utilize these languages face significant power and space limitations, such systems benefit from techniques for processing markup-language document with limited memory and computational resource requirements.

SUMMARY OF THE INVENTION

In accordance with the present invention, certain disadvantages and problems associated with data processing systems have been substantially reduced or eliminated. In particular, a system and method for indicating an acceptance status of a markup-language data construct is provided.

In accordance with one embodiment of the present invention, a method for parsing a markup-language document includes detecting, in a markup-language document, a start of a first data node of a first node type and identifying a first data definition associated with the first node type. The first data definition specifies defined contents of the first node type. The method further includes adding a first entry associated with the first data node to a data structure and reading, from the markup-language document, contents of the first data node. The method also includes determining a status of the first data node based on the first data definition and the contents read from the first data node and indicating the status of the first data node on a graphical user interface.

In accordance with another embodiment of the invention, a system for parsing a markup-language document includes a memory, a processor, and a graphical user interface ("GUI"). The memory is capable of storing markup-language documents. The GUI is capable of displaying a status of one or more data nodes based on information received from a processor. The processor is capable of detecting, in a markup-language document, a start of a first data node of a first node type and identifying a first data definition associated with the first node type. The first data definition specifies defined contents of the first node type. The processor is also capable of adding a first entry associated with the first data node to a data structure and reading, from the markup-language document, contents of the first data node. The processor is also capable of determining a status of the first data node based on the first data definition and the contents read from the first data node and indicating the status of the first data node on the GUI.

Technical advantages of certain embodiments of the present invention include a robust technique for determining completeness of nodes included in markup-language documents and improved flexibility for processing non-standard markup-language formats. Other technical advantages of certain embodiments include effective techniques for displaying information pertaining to the completeness of data nodes. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 illustrates operation of a data processing system according to a particular embodiment;

FIGS. 2A-2B illustrate an example operation of a schema compiler according to a particular embodiment;

FIG. 3 illustrates operation of a processing component while sequentially accessing a compiled schema;

FIGS. 4A-4C illustrate an example operation of a generic encoder according to a particular embodiment;

DETAILED DESCRIPTION OF THE INVENTION

Figure 2B:
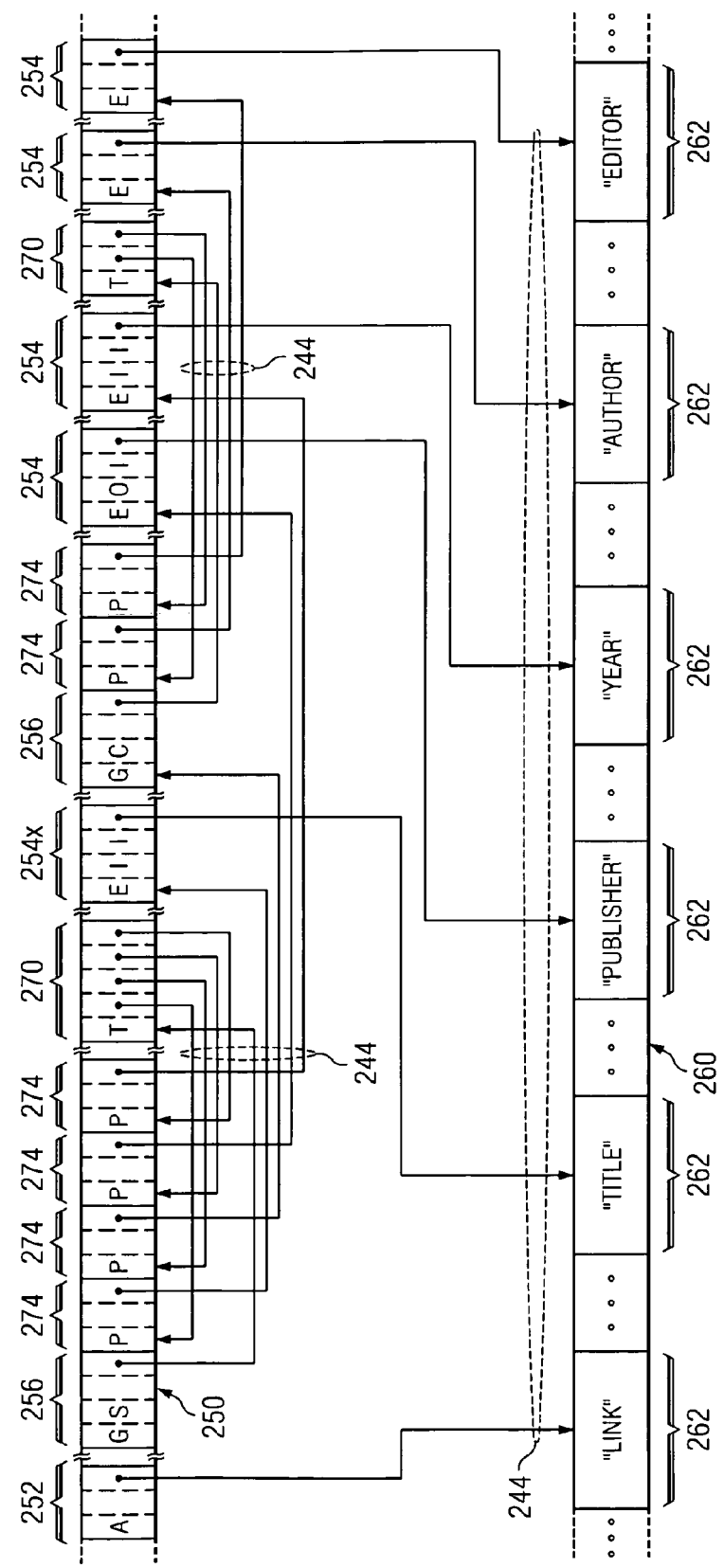

FIG. 1 illustrates a data processing system 10 operable to generate, transmit, and process XML data documents. Data processing system 10 includes generating applications 20*a* and *b*, a generic encoder 30, a specific encoder 35, a schema compiler 40, a document decoder 50, and a receiving application 60. Generating application 20 generates data documents 70 which generic encoder 30 or specific encoder 35 encodes for transmission to receiving application 60. Data processing system 10, in particular embodiments, utilizes compiled schema 85 and particular encoding and processing techniques to reduce information exchanged between generating application 20 and receiving application 60. As a result, particular embodiments of data processing system 10 may reduce the memory and processing resources needed to utilize information included in data documents 70.

Generating applications 20*a* generates data documents 70 that include data structured and formatted in conformance with the XML language or any other text-based markup language, protocol, or standard. Although the description below focuses on particular embodiments of data processing system 10 configured to utilize data documents 70 conforming to the XML language, data processing system 10 and/or individual components of data processing system 10 may be configured for use with data documents 70 of any appropriate markup language including, but not limited to, XML, Hypertext Markup Language ("HTML") and Standard Generalized Markup Language ("SGML"). Generating application 20*b* generates pre-bound data documents 78 that include data constructs with the same or similar hierarchical structure too the data constructs included in data documents 70 but that have been bound to a particular schema, as described in greater detail below. Pre-bound data documents 78 may, for example, utilize numeric delimiters instead of XML-style textual delimiters that identify the name or type of the construct being delimited. For the purposes of this description, generating applications 20 may "generate" data documents by accessing a memory 100 of data processing system 10 to retrieve data documents, by receiving data documents 70 from another component of data processing system 10, or by itself creating data documents 70. As one example, generating applications 20 may represent web browsers that form XML purchase requests based on user input and transmits the purchase requests to receiving application 60. As another example, generating application 20 may represent an address-book application on a desktop computer that saves contact information in data documents 70 and then transmits data documents 70 to a mobile phone or personal digital assistant ("PDA") to be utilized by receiving application 60.

In particular embodiments, generating applications 20 may each represent a software process running on a processor or other suitable electronic computing device. As used in this description and the claims below, a "processor" may represent general purpose computers, dedicated microprocessor, or other processing device capable of generating, processing, and/or communicating electronic information. Examples of processor 110 include application-specific integrated circuits (ASICs), field-programmable gate arrays (FPGAs), digital signal processors (DSPs) and any other suitable specific or general purpose processors.

In general, however, generating applications 20 may each represent and/or include any collection of software and/or hardware appropriate to provide the described functionality. Additionally, although FIG. 1 illustrates a particular embodiment of data processing system 10 that includes both generating applications 20a and 20b, a particular embodiment of data processing system 10 may include either or both generating applications 20. Furthermore, in particular embodiments, the same element of data processing system 10 may represent both generating applications 20a and 20b, capable of generating both data documents 70 and pre-bound documents 78 as appropriate.

Receiving application 60 receives data documents 70 from document decoder 50 or other components of data processing system 10 and performs some task or operation with data documents 70. Data processing system 10 may include a network or other suitable connectivity components to connect generating application 20 and receiving application 60. As one example, receiving application 60 may represent an application running on a networked computer in data processing system 10 that processes customer orders contained in data documents 70. As another example, receiving application 60 represents an application running on a mobile communication device capable of accessing contact information uploaded onto the device as data documents 70. Additionally, in a particular embodiment, generating application 20 and receiving application 60 may represent the same application, process, or group of components during different phases of operation or while performing different tasks. For example, generating application 20 may represent an application that generates and stores data documents 70, and receiving application 60 may represent that same application when the application subsequently retrieves data documents 70 from memory 100. In general, receiving application 60 may represent or include any collection of software and/or hardware appropriate to provide the described functionality. In particular embodiments, receiving application 60 represents a software process running on a computer processor.

Schema compiler 40 compiles uncompiled schema 80 to produce compiled schema 85. In a particular embodiment, schema compiler 40 generates complied schema that represents one or more arrays of primitive data. Schema compiler 40 also provides compiled schema 85 to generic encoder 30 and other components of data processing system 10. Schema compiler 40 may represent components, modules or any other appropriate portion of generic encoder 30 or may represent component or components physically and/or logically distinct from generic encoder 30. In particular embodiments, schema compiler 40 represents a software process running on a computer processor.

Generic encoder 30 binds data documents 70 to specified data definitions and encodes data documents 70 to create encoded documents 72a. More specifically, in particular embodiments, generic encoder 30 receives data documents 70 from generating application 20 and compiled schema 85 from schema compiler 40. Generic encoder 30 then binds one or more data nodes 90 in data documents 70 to definitions in compiled schema 85 and encodes the bound data nodes to produce encoded documents 72a. Generic encoder 30 may represent or include any collection of hardware and/or software suitable to provide the described functionality. Furthermore, generic encoder 30 may represent a portion of generating application 20 or receiving application 60, or may represent components physically and/or logically distinct from either. In particular embodiments, generic encoder 30 represents a software process running on a computer processor.

Specific encoder 35 encodes pre-bound documents 78 to create encoded documents 72b. More specifically, in particular embodiments, specific encoder 35 receives data documents that generating application 20 has already bound to definitions in compiled schema 85. In such an embodiment, specific encoder 35 may not be responsible for any binding and may instead encode pre-bound documents 78 received from generating application 20. Specific encoder 35 may represent or include any collection of hardware and/or software suitable to provide the described functionality. Furthermore, specific encoder 35 may represent a component, module, or other portion of generating application 20 or receiving application 60, or may represent components physically and/or or logically distinct from either. Although FIG. 1 and the description below describe an embodiment of data processing system 10 that includes, for purposes of illustration, both generic encoder 30 and specific encoder 35, particular embodiments of data processing system 10 may include one or both of generic encoder 30 and specific encoder 35. In particular embodiments, specific encoder 35 represents a software process running on a computer processor.

Document decoder 50 receives and decodes encoded documents 72 for use by receiving application 60. More specifically, document decoder 50 references compiled schema 85 to generate decoded documents 74 from encoded documents 72. Decoded documents 74 contain data nodes 90 or other markup-language data constructs that include information substantially equivalent to information included in data nodes 90 of data documents 70. In a particular embodiment, decoded documents 74 may be identical to original data documents 70. In particular embodiments, document decoder 50 represents a software process running on a computer processor.

Memory 100 stores data documents 70, encoded documents 72, decoded documents 74, and/or values and parameters utilized by elements of data processing system 10 during operation. Memory 100 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices. The description below uses the term "memory 100" to refer to any such memory device or memory devices in data processing system 10, coupled to data processing system 10, or otherwise accessible by data processing system 10 or elements of data processing system 10. Thus, any two references to "memory 100" in this description may or may not refer to the same physical device depending on the configuration and contents of a particular embodiment of data processing system 10.

Although FIG. 1 illustrates a particular embodiment of data processing system 10 that includes a particular number of processors 110, data processing system may, in general, include any suitable number of processors 110. Additionally, although FIG. 1, illustrates an embodiment of data processing system 10 that includes generating application 20, generic encoder 30, specific encoder 35, schema compiler 40, receiving application 50, and document decoder 60 running on separate processors 110, any two or more of these elements may represent software processes running on one or more common processors 110. As a result, these elements may be divided among processors 110 in any appropriate manner.

In operation, schema compiler 40 receives or accesses uncompiled schema 80. Schema compiler 40 may generate uncompiled schema 80, receive uncompiled schema 80 from another component of data processing system 10, retrieve uncompiled schema 80 from memory 100 coupled to schema compiler 40, or acquire uncompiled schema 80 in any other appropriate manner. Uncompiled schema 80 includes one or more definition nodes which define the contents, the structure, the appropriate number of occurrences, and/or any other suitable characteristic (referred to collectively as "defined contents") of data nodes 90 defined within, recognized in, or supported by data processing system 10. In a particular embodiment, data processing system 10 is configured to process XML documents 70 and uncompiled schema 80 represents a document containing XML schemas. Uncompiled schema 80 may however include data definitions of any form appropriate based on the markup language or languages supported by data processing system 10.

Schema compiler 40 then compiles uncompiled schema 80 to produce compiled schema 85. In compiling uncompiled schema 80, schema compiler 40 may reduce the size of uncompiled schema 80 by reducing or eliminating redundant or otherwise unnecessary information that is included in uncompiled schema 80. Schema compiler 40 may also perform any additional processing steps on uncompiled schema 80 based on the characteristics and configuration of uncompiled schema 80, schema compiler 40, and data processing system 10. FIG. 2A, discussed below, illustrates the contents of an example compiled schema 85 that may be utilized in a particular embodiment of data processing system 10. After schema compiler 40 has compiled uncompiled schema 80 to produce compiled schema 85, schema compiler 40 may transmit or provide compiled schema 85 to generic encoder 30. In particular embodiments, schema compiler 40 may provide compiled schema 85 to generic encoder 30 by saving compiled schema 85 to memory 100 accessible by both generic encoder 30 and schema compiler 40.

At an appropriate time, generic encoder 30 receives one or more data documents 70 from generating application 20. Using compiled schema 85, generic encoder 30 binds data nodes 90 to compiled schema 85 and encodes the bound data nodes 90 to produce encoded documents 72. In binding data nodes 90, generic encoder 30 identifies, in compiled schema 85, a particular definition node 210 for each data node 90 in data document 70, based on a node type of the relevant data node 90. Generic encoder 30 then reduces or eliminates from these data nodes 90 particular information that is redundant or unnecessary in light of the information in definition nodes 210. This process according to a particular embodiment is described in greater detail below with respect to FIG. 3.

In encoding data documents 70, generic encoder 30 removes, restructures, reorganizes, replaces, reformats, or otherwise modifies data included in data documents 70 to reduce the size of data documents 70 and/or reduce the computational requirements of processing data documents 70. For example, in a particular embodiment of generic encoder 30, generic encoder 30 generates encoded documents 72 that reduce the number of delimiters used in data documents 70 and converts text elements from American Standard Code for Information Interchange ("ASCII") format characters to Unicode Transformation Format ("UTF-8") byte sequences. The operation of generic encoder 30 is illustrated in greater detail below with respect to FIGS. 4A-4C.

Figure 5:
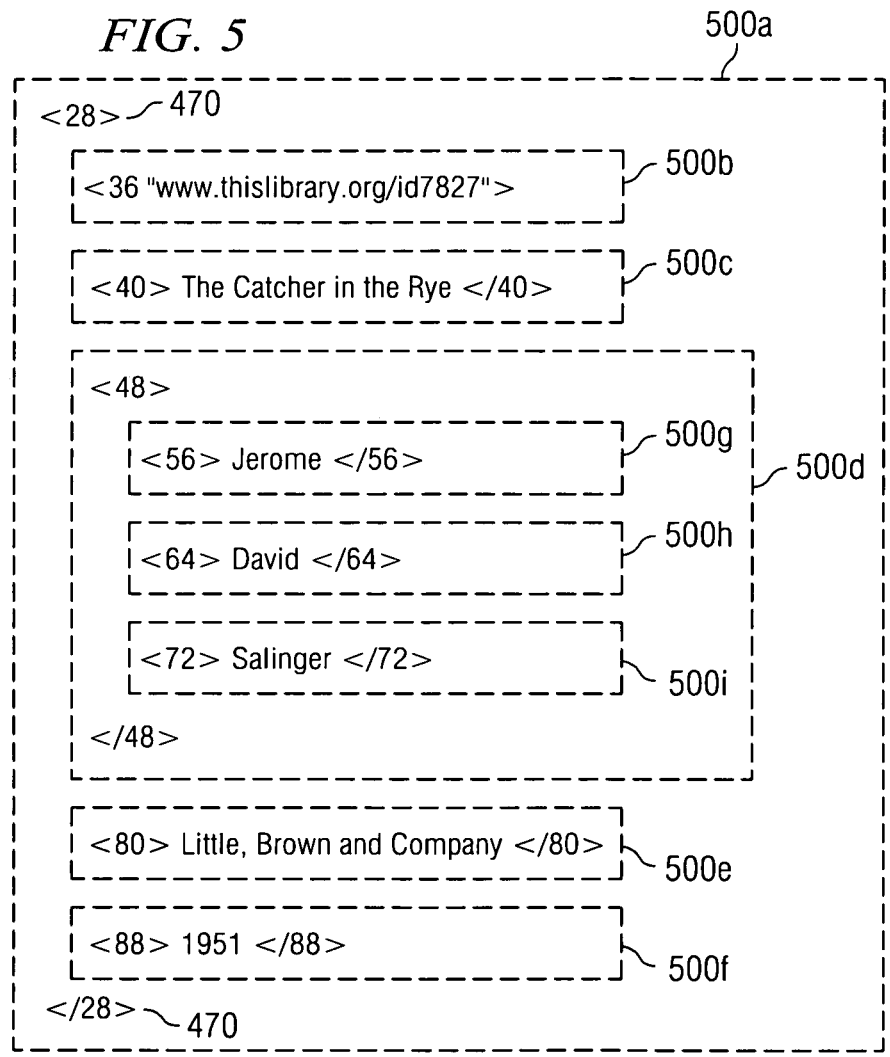
FIG. 5 illustrates operation of a specific encoder according to a particular embodiment.

Specific encoder 35 also encodes information generated by generating application 20. More specifically, specific encoder 35 encodes pre-bound documents 78 generated by generating application 20. Pre-bound documents 78 may include one or more bound data nodes 500 (as shown in FIG. 5) containing information substantially equivalent to data nodes 90 generated by generating application 20 but already bound to compiled schema 85. In a particular embodiment of specific encoder 35, specific encoder 35 generates encoded documents 72b that reduce the number of delimiters used in pre-bound documents 78 and converts text elements from ASCII-format characters to UTF-8 byte sequences. The operation of specific encoder 35 is illustrated in greater detail below with respect to FIGS. 5A-5C.

Document decoder 50 receives encoded documents 72 from generic encoder 30 and/or specific encoder 35 and decodes encoded documents 72 to produce decoded documents 74. In decoding encoded documents 72, document decoder 50 may restructure, reorganize, replace, reformat, rearrange, or restructure data documents 70 in any appropriate manner to convert encoded documents 72 to a form useable by receiving application 60. As one example, document decoder 50 may convert bound data nodes 90 back to the original data nodes 90 or into data nodes 90 of another form that include substantially similar information to that included in the original data nodes 90. In a particular embodiment, document decoder 50 converts bound data nodes 90 to decoded data nodes 90 representing XML-language data constructs. The operation of document decoder 50 is illustrated in greater detail below with respect to FIG. 5.

After decoding encoded documents 72, document decoder 50 transmits data documents 70 to receiving application 60. Receiving application 60 may then use decoded documents 74 in any appropriate manner based on the configuration and characteristics of receiving application 60 and data processing system 10. For example, in a particular embodiment, receiving application 60 represents a phonebook application on a mobile communication device capable of displaying contact information received in decoded data nodes 90 of decoded documents 74.

Because particular embodiments of data processing system 10 reduce the amount of information transmitted between components of data processing system 10 and reduce the computational resources required to process data documents 70, such embodiments may be able to operate with limited memory, processing, or power resources. Moreover, because of the reduced computational requirements of particular operations performed by components of data processing system 10, particular embodiments of data processing system 10 may also provide speed and efficiency benefits. Additionally, because data processing system 10 may include a network or other connectivity elements connecting particular components of data processing system 10, the described techniques may also provide traffic-reducing benefits in particular embodiments of data processing system 10.

FIG. 2A illustrates contents of a portion of an example uncompiled schema 80 utilized by a particular embodiment of data processing system 10. Uncompiled schema 80 includes definition nodes 210 for one or more types of data nodes 90 recognized, supported, or understood by data processing system 10. In a particular embodiment, data processing system 10 utilizes XML data documents and, in such an embodiment, uncompiled schema 80 may define these data nodes 90 using XML schema constructs. In the illustrated embodiment, uncompiled schema 80 includes a plurality of definition nodes 210. Each definition node 210 defines a type of data node 90 supported by data processing system 10. Data nodes 90 are described in greater detail below with respect to FIG. 4A.

Definition nodes 210 may represent a schema definition or any other suitable data definition appropriate to define the contents, format, and/or other characteristics of the associated data nodes 90. Additionally, uncompiled schema 80 may include one or more different types of definition nodes 210, each to be processed by components of data processing system 10 in distinct manner, as discussed further below. For example, a particular embodiment of data processing system 10 utilizes uncompiled schema 80 that may contain any of the schema types recognized by the XML schema standard including, but not limited to, schema, element, attribute, namespace, simple type, complex type, particle, group, wildcard, and attribute use nodes.

Definition nodes 210 may contain other definition nodes 210, depending on the structure of the relevant definition node 210. For the purposes of this description, any definition nodes 210 contained by a particular definition node 210 are considered "child" nodes, or "children," of that particular definition node 210 and that particular definition node 210 is considered the "parent" or "parent node 210" of these children. For example, in the illustrated uncompiled schema 80, definition node 210b includes definition nodes 210c and 210d, and definition node 210d includes definition nodes 210e, 210f, 210g, and 210h. Thus, definition nodes 210c and 210d represent child nodes 210 of definition node 210b. Similarly, definition nodes 210e, 210f, 210g, and 210h represent child nodes 210 of definition node 210d.

FIG. 2B illustrates operation of schema compiler 40 in compiling uncompiled schema 80 according to techniques utilized by particular embodiments of schema compiler 40. As indicated above, schema compiler 40 receives uncompiled schema 80 from another component of data processing system 10, retrieves uncompiled schema 80 from memory 100, generates uncompiled schema 80 independently, or acquires uncompiled schema 80 in any other appropriate manner. Schema compiler 40 then compiles uncompiled schema 80, reducing the amount of space required to store data definitions supported by data processing system 10.

More specifically, schema compiler 40 acquires uncompiled schema 80 and begins parsing uncompiled schema 80. In the illustrated embodiment, schema compiler 40 creates a node array 250 and a name array 260 for each definition node 210 in uncompiled schema 80. Node array 250 and name array 260 may each represent any appropriate form of data structure including, but not limited to, an array, a record, a stack, an object, or any other suitable data structure. Node array 250 contains information, stored as node entries 252, describing the hierarchical relationship of definition nodes 210 defined in uncompiled schema 80. Each node entry 252 specifies the children of the definition node 210 associated with that particular node entry 252 and other additional properties of that definition node 210. Additionally, each node entry 252 includes a reference 244 to a name entry 262 in name array 260 associated with the same definition node 210. Reference 244 may represent a pointer, a link, or any other form of reference.

Node entry 252 may also include any suitable additional information for describing the contents, structure, format, and/or other characteristics of the defined nodes 90. For example, in a particular embodiment, node entry 252 may include such information as a minimum occurrence value 280 and a maximum occurrence value 282. In the illustrated embodiment, minimum occurrence value 280 and a maximum occurrence value 282, respectively, represent a minimum and maximum number of times the associated node 90 should appear within a particular instance of its parent and are generated by schema compiler 40 from the minOccurs and maxOccurs properties of the XML schema elements associated with the relevant definition nodes 210. For example, minimum occurrence value 280 and maximum occurrence value 282 for particle entry 254x indicate that the "TITLE" element should appear a minimum of one time and a maximum of one time in a "BOOK" element conforming to compiled schema 85.

Name array 260 includes a name entry 262 for each definition node 210 specifying a textual name for that definition node 210. In a particular embodiment, name entry 262 includes a textual identifier 264 that specifies this textual name for definition node 210. In a particular embodiment, name entry 262 may also contain a reference back to node entry 252 associated with that name entry 262. In general, name entry 262 may include any appropriate additional information.

As schema compiler 40 parses uncompiled schema 80, schema compiler 40 generates a new node entry 252 in node array 250 for each additional definition node 210 in uncompiled schema 80 identified by schema compiler 40. Depending on the type of definition node, schema compiler 40 may also add a new name entry 262 to name array 260. Schema compiler 40 may also perform any other appropriate steps or operations to compile uncompiled schema 80.

For example, in the illustrated embodiment, which utilizes XML schema definitions, schema compiler 40 creates a node entry 252 for each schema node in the uncompiled schema 80. For group nodes, such as definition nodes 210a and 210c of FIG. 2A, schema compiler 40 generates a particular type of node entry 252, referred to here as a "group entry 256", in node array 250. Group entry 256 includes a group identifier 272 that specifies the group type of the relevant group definition node 210 and one or more state delegation tables 270 that includes a particle entry 274 for each child of the group definition node 210. Each particle entry 274 includes reference 244 to an entry associated with an element or another group that is a child of the relevant group. For example, in compiling the example uncompiled schema 80 of FIG. 2A, schema compiler 40 generates a state delegation table 270 for definition node 210c that includes pointers to node entries 252 for children of definition node 210c, including definition nodes 210f-g. Group entry 256 may also include any further information appropriate based on the configuration and characteristics of schema compiler 40. For example, in a particular embodiment, group entry 256 includes a size value 258 in group entry 256 that specifies a size of the associated state delegation table 270.

As noted, group entry 256 may include one or more state delegation tables 270. In a particular embodiment, when schema compiler 40 generates group entry 256 for an all or a "Choice" group node, such as definition node 210g, schema compiler 40 generates a single state delegation table 270 for that definition node 210. When schema compiler 40 encounters a "Sequence" group node in uncompiled schema 80, schema compiler 40 generates a state delegation table 270 for each child definition node 210 of the "Sequence" group. Thus, in compiling the example uncompiled schema 80, schema compiler 40 generates four separate state delegation tables 270 for definition node 210d, one for each of the children definition nodes 210f-k. In such a situation, each state delegation table 270 may include references to the remaining children definition nodes 210 following each step of parsing the relevant "Sequence" group definition node 210.

For example, for a "Sequence" group definition node 210 defined to include an element "A," and element "B," and element "C," schema compiler 40 may generate a first state delegation table 270 with separate references 244 to element "A," element "B," and element "C," a second state delegation table 270 with references 244 to element "B" and element "C," and a third state delegation table 270 with a reference 244 to element "C." By contrast, in this embodiment of schema compiler 40, an "All" group definition node 210 defined to include the same elements may only have a single state delegation table 270 with a separate reference 244 to each element "A," element "B," and element "C." For element nodes, attribute nodes, or any other form of non-group nodes that define XML objects that will contain substance when instantiated, such as definition nodes 210h and 210q, schema compiler 40 may generate a particular type of node entry 252, referred to here as a "substance entry 254", in node array 250. Substance entry 254 includes reference 244 to a name entry 262 associated with the relevant element node. If the definition node 210 associated with substance entry 254 includes children definition nodes 210, substance entry 254 also includes reference 244 to a substance entry 254 or group entry 256 associated with the child definition node 210. Substance entry 254 may include any further information appropriate based on the configuration and characteristics of schema compiler 40. For example, substance entry 254 may include a substance identifier specifying a node type, such as "element", "attribute", or "wildcard", for the substance entry 254.

As schema compiler 40 parses uncompiled schema 80, schema compiler 40 may step through the hierarchical structure of uncompiled schema 80, creating node entries 252 for each definition node 210 and then creating node entries 252 for each child of that definition node 210 with appropriate references 244 to the node entries of children of the parent definition node 210. Where appropriate schema compiler 40 may also generate name entries 262 in name array 260 for particular node entries 262. After completing the parsing of uncompiled schema 80 or at any other appropriate time, schema compiler 40 may then write both node array 250 and name array 260 to a file representing compiled schema 85, or may otherwise store node array 250 and name array 260 in memory 100. Additionally, schema compiler 40 may then make compiled schema 85 available to generic encoder 30 for use in encoding data documents 70, as described in greater detail with respect to FIGS. 4A-4C.

By reducing the amount of information that is retained for each definition node 210, particular embodiments of schema compiler 40 may generate compiled schema 85 that is smaller than uncompiled schema 80 but that provides information equivalent to uncompiled schema 80. Furthermore, the structure of compiled schema 85 may allow greater flexibility and simplicity in accessing individual elements of compiled schema 85 as discussed further below. As a result, schema compiler 40 and the described techniques for generating compiled schema 85 may provide several operational benefits to data processing system 10.

FIG. 3 illustrates a technique for sequentially accessing node entries 252 of compiled schema 85 that may be utilized by a processing component 300 of particular embodiments of data processing system 10. Accessing elements of node array 250 in compiled schema 85 sequentially, rather than hierarchically, may provide a more efficient manner for performing certain operations, such as concatenating multiple compiled schema 85 together. In particular, accessing nodes entries 252 in a hierarchical manner may require accessing each node entry 252 at least two times for each child node entry 252 associated with that node entry 252. As a result, sequential access may reduce the time and computational steps involved in performing certain operations.

Processing component 300 may represent schema compiler 40, generic encoder 30, or any other component of data processing system 10 that process, manages, or utilizes compiled schema 85, including components not included in FIG. 1 or identified in the above discussion. As one example, processing component 300 may represent a data management module of data processing system responsible for managing compiled schema 85 maintained on data processing system 10. As another example, as discussed in greater detail below, particular embodiments of generic encoder 30 utilize compiled schema 85 to bind data nodes 90 of data documents 70 to particular definition nodes 210 during encoding. Thus, processing component 300 may represent a particular embodiment of schema compiler 40 that uses the described techniques to concatenate multiple compiled schema 85. In general, processing component 300 may represent any collection of hardware and/or software suitable to provide the described functionality and may utilize the described techniques to access information in compiled schema 85 while performing any suitable operation involving compiled schema 85.

In operation, processing component 300 receives, retrieves, or generates compiled schema 85. Processing component 300 then accesses a node entry 252 in node array 250 of compiled schema 85, as shown by arrow 372a. The accessed node entry 252 may represent the first node entry 252 in node array 250, a node entry 252 associated with a particular element of compiled schema 85, or any other node entry 252 of compiled schema 85. For the purposes of illustration, this description assumes that processing component 300 accesses the first node entry 252 in node array 250, referred to here as "first node entry 252a." Processing component 300 may access first node entry 252a by reading a first line of compiled schema 85, by using an index or pointer obtained from another component or application, or by using any other appropriate technique. Once processing component 300 has accessed first node entry 252a of node array 250, processing component 300 may, in particular embodiments of data processing system 10, utilize certain characteristics of compiled schema 85 to access subsequent node entries 252 in a sequential manner. More specifically, processing component 300 may determine a size of a particular node entry 252 based on size values associated with a node type of that definition node 210. Processing component 300 may then utilize the size of that definition node 210 to access the next definition node 210 in node array 250.

For example, in the illustrated embodiment, processing component 300 maintains a size table 310 in memory 100. Size table 310 specifies one or more size values associated with each node type 320. Processing component 300 may access this size table 310 to determine a size for a particular node entry 252, after determining a node type 320 of that node entry 252. Although FIG. 3 illustrates an embodiment of processing component 300 that maintains suitable size values in size table 310, processing component 300 may maintain size values in any suitable manner. Moreover, processing component may instead receive size values from other components of data processing system 10 or determine size values as needed during operation. In general, processing component 300 may maintain, receive, generate, or otherwise obtain size values in any suitable fashion.

In a particular embodiment of data processing system 10 that supports XML, node array 250 of compiled schema 85 may include node entries 252 associated with schema nodes, element nodes, attributes nodes, namespace nodes, simple type nodes, complex type nodes, particle nodes, group nodes, wildcard nodes, and attribute use nodes in uncompiled schema 80. Additionally, node array 250 may include, for each group definition node 210, one or more node entries 252 representing state delegation tables 270 associated with that group definition node 210. As noted above, the size of a particular node entry 252 is based, at least in part, on the type of definition node 210 associated with that node entry 252.

More specifically, in the illustrated embodiment of data processing system 10, node entries 252 associated with element nodes, attribute nodes, complex type nodes, particle nodes, and attribute use nodes have a fixed size based on the type of the associated definition node 210. For example, node entries 252 associated with element nodes have a fixed size of eight (8) bytes. Processing component 300 may determine the size of a fixed-size node entry 252 by determining the specific node type associated with the fixed-size node entry 252 and then accessing stored information identifying a fixed-size value 350 for that particular node type. For example, in the illustrated embodiment, processing component 300 maintains a size table 310 in memory 100. Size table 310 specifies one or more size value associated with each node type 320. Processing component 300 may access this size table 310 to determine a size for a particular node entry 252, after determining a node type 320 of that node entry 252. In general, however, processing component 300 or any other data processing system 10 may maintain, any appropriate manner, fixed-size values 250 indicating, in any suitable form, size for fixed-size node types 320.

Additionally, in this embodiment of data processing system 10, node entries 252 associated with schema nodes, namespace nodes, simple type nodes, group nodes, and wildcard nodes have a variable size. The variable size is based on both a fixed portion associated with that node type 350 and a variable portion that depends on the content of the variable size node entry 252. More specifically, the variable size is the sum of a base size value 360 associated with that node type 350 and one or more content-dependent values. Each content-dependent value represents the product of a content size value 362 for a particular type of content for that node type 350 and the quantity of that content that the definition node 210 associated with the variable-sized node entry 252 possesses. The content may represent children definition nodes 210 of that definition node 210 or any other appropriate content that may affect the size of associated node entry 252.

For example, node entries 252 associated with namespace nodes, in this example embodiment, have a base size value 360 and a first content size value 362 for each element defined in the associated namespace definition node 210, a second content size value 362 for each attribute defined in the associated namespace definition node 210, and a third content size value for each type defined in the associated namespace definition node 210. Thus, if the base size value 360 is assumed to be eight (8) bytes, the first content size value 362 is assumed to be one byte, the second content size value 362 is assumed to be one byte, and the third content size value 362 is assumed to be two (2) bytes, then a node entry 252 associated with a namespace definition node 210 in which five elements, fifteen attributes, and four types have been defined will have a content size value of:

content size value=(1*5)+(1*15)+(2*4)=28 bytes.

Furthermore, if the base size value 360 for namespace value is 10 bytes, then the variable size for this example namespace would be 28+10=38 bytes. Thus, a node entry 252 associated with a namespace definition node 210 formed in accordance with uncompiled schema 80 and in which five elements, fifteen attributes, and four types have been defined will have a size of 38 bytes.

As a result, in response to determining that a particular node entry 252 is a variable-sized node entry 252, processing component 300 may determine the size of that node entry 252 by accessing size table 310, or other appropriate information in data processing system 10, to determine base size value 360 and one or more content size value 362 for the node type of the associated definition node 210. Processing component 300 may then determine the quantity of one or more types of content included in node entry 252. After determining the quantity of content, processing component 300 may then determine one or more content-dependent size values by multiplying the quantity of a particular type of content by the content size value for that type of content. Processing component 300 may then calculate the size of the variable sized node entry 252 by summing the base size value 360 and the content-dependent size value for each type of content contained in the node entry 252.

Additionally, in a particular embodiment of data processing system 10, node entries 252 associated with group nodes, such as group entries 254 may reference one or more state delegation tables 270 in node array 250, as described above. In a particular embodiment of data processing system 10, state delegation tables 270 contain explicit size values 290 specifying the size of the associated state delegation table 270 in node array. Thus, processing component 300 may determine the size of a particular state delegation table 270 in node array 250 by accessing explicit size value 290 stored in that state delegation table 270.

After determining the size of first node entry 252a, processing component 300 may calculate an index 370b associated with the node entry 252b immediately following first node entry 252a in node array 250. In particular, processing component may use the size of first node entry 252a as index 370b for locating the next node entry 252b in node array 250 or may add the size of first node entry 252a to index 370a of first node entry 252a to determine index 370b for the next node entry 252b. Processing component 300 may then access the next node entry 252b as shown by arrow 372b. Processing component 300 may then repeat the above process to determine the size of the next node entries 252c-d, calculate index 370c-d for the node entries 252c-d following the next node entry 252b and access node entries 252c-d, as shown by arrows 372c-d. As a result, processing component 300 may be able to use this technique to access each node entry 252 of node array 250 sequentially and may perform a particular operation to each node entry 252 or to selected node entries 252 within node array 250. For example, if compiled schema 85 is moved to a new storage location, processing component 300 may modify a pointer in each node entry 252 of node array 250 to reflect the new location of compiled schema 85.

Thus, the described techniques allow processing component 300 to access node entries 252 sequentially in particular embodiments of data processing system 10. Sequential access may allow processing element 300 to perform certain operations, such as those that involve accessing each definition node 210 of the associated uncompiled schema 80 once, with greater speed than would be possible by accessing uncompiled schema 80 hierarchically. As a result, sequential access may increase the operating speed of processing component 300.

Furthermore, accessing node entries 252 hierarchically may result in processing component 300 accessing a particular node entry 252 more than once as processing component 300 accesses each child of the node entry 252 in question. This may cause undesirable results if processing component 300 repeatedly performs a particular operation on the node entry 252. Thus, sequential access may reduce the computational complexity of performing certain tasks as sequential access may eliminate the need to determine whether processing component 300 has already accessed a particular node entry 252.

Figure 4A:
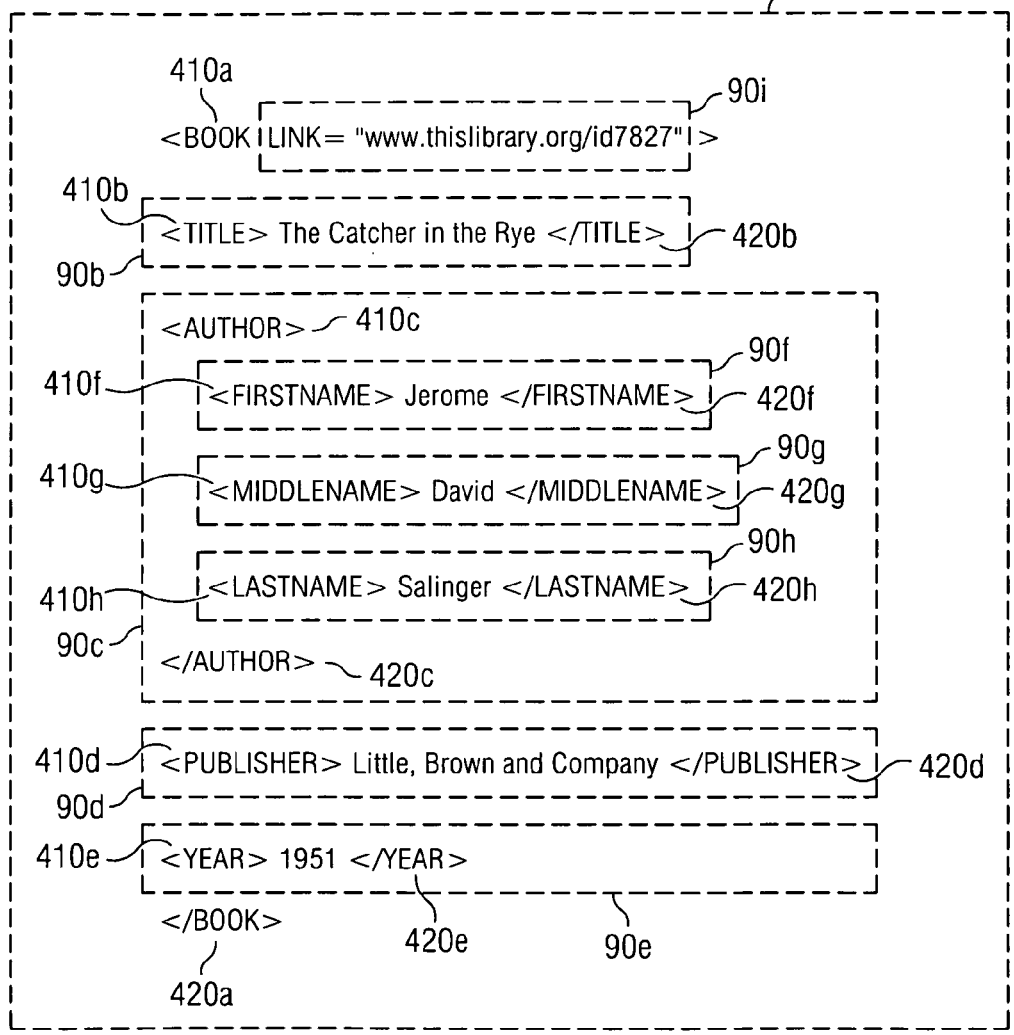

FIG. 4A illustrates contents of an example data document 70 utilized by a particular embodiment of data processing system 10. Data document 70 includes a plurality of data nodes 90. Data nodes 90 represent markup-language data objects, elements, or other constructs. In the illustrated embodiment, data nodes 90 represent XML constructs. Data nodes 90 may contain other data nodes 90. For the purposes of example, data node 90a includes data nodes 90d-f, while data node 90b includes data nodes 90g-k. As noted above, although FIGS. 4A-4C focus on an embodiment of data processing system 10 that utilizes XML data documents 70, particular embodiments of processing system 10 may utilize data documents 70 structured according to any appropriate markup language.

Data nodes 90 may include, or be preceded by, textual start delimiters 410. Moreover, data nodes 90 may include, or be followed by, textual end delimiters 420. Textual start delimiters 410 and textual end delimiters 420 may represent any text indicating a beginning or end, respectively, of data nodes 90. Textual start delimiters 410 and textual end delimiters 420 may represent a portion of the data node 90 these delimiters delimit or may represent text entirely distinct from the contents of data node 90. In a particular embodiment, textual start delimiters 410 and textual end delimiters 420 represent XML start and end tags, respectively.

Additionally, textual start delimiters 410 and/or textual end delimiters 420 may specify a node type for their associated data nodes 90. In a particular embodiment, textual start delimiters 410 and textual end delimiters 420 include textual identifier 264 that specifies the node type of their associated data node 90. Generic encoder 30 may use textual identifier 264 of data node 90 to identify, in node array 250, a node entry 252 associated with that data node 90, as described in greater detail with respect to FIG. 4B.

Figure 4B:
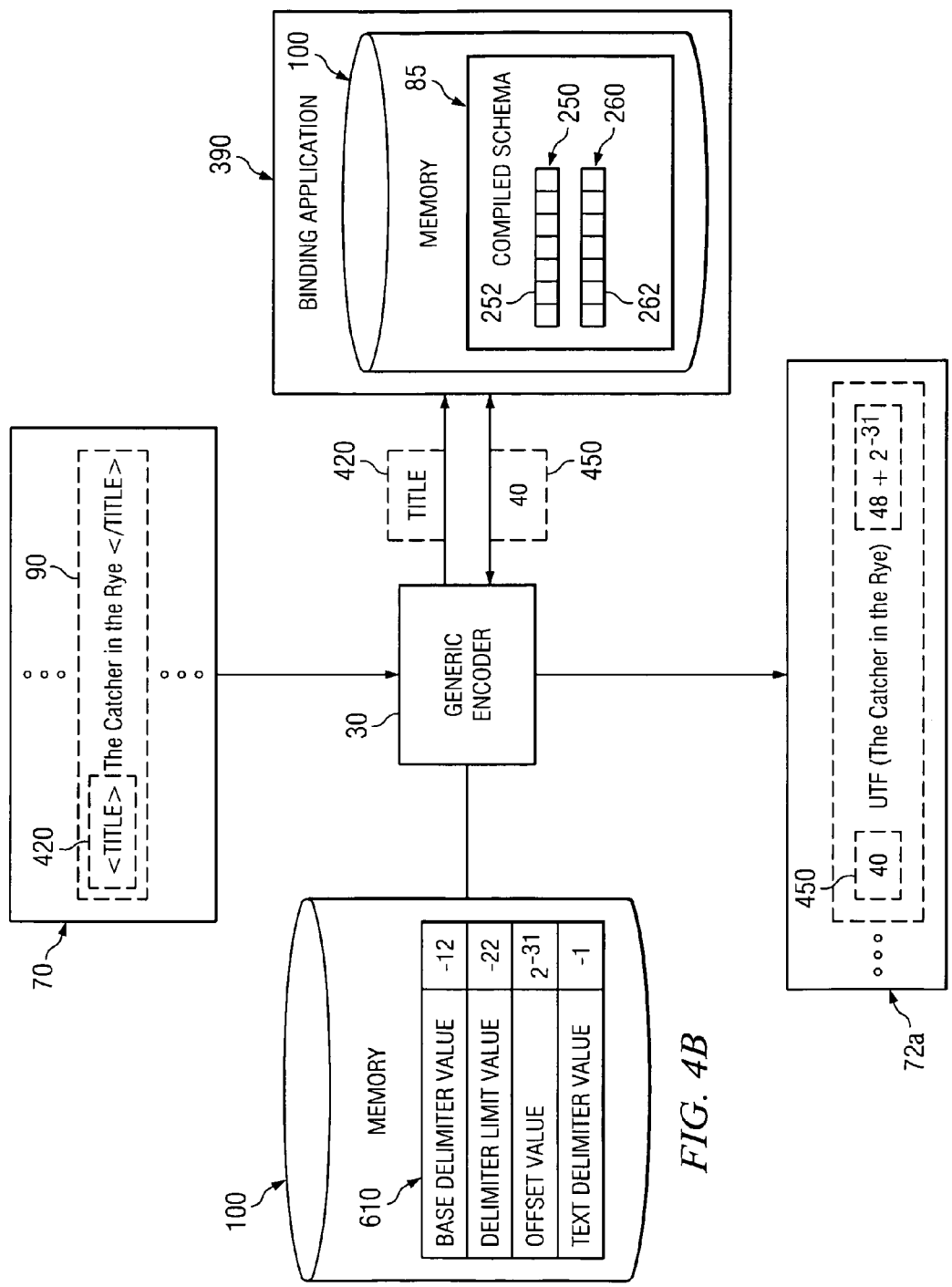

FIG. 4B illustrates operation and contents of generic encoder 30 according to a particular embodiment. Particular embodiments of data processing system 10 may use generic encoder 30 in conjunction with a binding application 390 to encode data documents 70, based on a particular compiled schema 85, to reduce the amount of information retained by data documents 70. More specifically, because XML and other markup languages are often utilized to generate data documents 70 that are meaningful to human readers, information is often included in such documents that is superfluous from the perspective of receiving application 60. Thus, generic encoder 30 may receive standard XML documents and bind data nodes 90 in these XML documents to a specified XML schema to reduce the amount of information that must be retained for each of the data nodes 90. As suggested above, reducing the amount of information stored in data documents 70 may reduce the amount of storage space needed to support receiving application 60 and/or the amount of time to access, store, and/or otherwise process data documents 70.

Generic encoder 30 receives data documents 70 and encodes data nodes 90 in these data documents 70. In the process, generic encoder 30 may utilize binding application 390 to bind nodes to compiled schema 85. As noted above with respect to FIG. 1, generic encoder 30 may represent physical components within data processing system 10, a software process running in data processing system 10, or any other form of computational or processing resources, including any suitable collection of software and/or hardware.

Binding application 390 receives compiled schema 85 from schema compiler 40, memory 100, or another appropriate element of data processing system 10 and binds data nodes 90 of data documents 70 associated with that compiled schema 85, in response to binding requests received from generic encoder 30 and/or other elements of data processing system 10. Binding application 390 may represent physical components within data processing system 10, software processes running on data processing system 10, and/or any other form of computational or processing resources. In particular embodiments of data processing system 10, binding application 390 comprises a virtual machine that supports one or more Application Programming Interfaces (APIs) for interaction with other elements of data processing system 10. Generic encoder 30 and/or other elements of data processing system 10 may utilize these APIs to submit binding requests to binding application 390 and to receive binding responses from binding application 390, as described in greater detail below. Additionally, binding application 390 and generic encoder 30 may represent physically discrete components or separate software processes, as shown, or may represent a single component or process suitable to provide the functionality described for both elements.

In operation, generic encoder 30 receives data documents 70 from generating application 20 or otherwise accesses data documents 70. Generic encoder 30 then parses data documents 70. As generic encoder 30 parses data documents 70, generic encoder 30 may encounter textual start delimiters 410 and textual end delimiters 420 that identify the start and the end, respectively, of individual data nodes 90 included in data documents 70. When generic encoder 30 detects the beginning of a data node 90, generic encoder 30 may transmit a binding request identifying the data node 90 to binding application 390. The binding request may identify data node 90 by a textual identifier 264, such as an XML tag, included in the textual start delimiter 410. In a particular embodiment, generic encoder 20 executes the binding request using a pair of Java methods, startElement( ) and startAttribute( ), supported by binding application 390. These methods accept as a parameter textual identifiers 264 of data nodes 90 representing XML elements and attributes and return a numeric identifier 450 for a particular definition node 210 associated with that textual identifier 264 in compiled schema 85. For example, using the example data document 70 illustrated in FIG. 3A, when generic encoder 30 encounters textual start delimiter "<TITLE>" of data node 90b in FIG. 4A, generic encoder 30 may bind data node 90b by invoking the startElement( ) method as follows:

startElement("TITLE")

Upon receiving a binding request associated with invocation of this method, binding application 390 may access node array 250 of compiled schema 85 to identify a node entry 252 associated with the specified textual identifier 264. More specifically, binding application 390 may access node array 250 and name array 260, hierarchically or sequentially, to find a name entry 262, a "matched name entry," that includes a string that matches textual identifier 264. The matched name entry may include information identifying a particular node entry 252, a "matched node entry", associated with the matched name entry. For example, in particular embodiments, each name entry 262 includes a pointer that identifies the node entry 252 associated with that name entry 262 (indicated by arrow 272 in FIG. 4B). In such an embodiment, binding application 390 may determine the matching name entry 262 by matching textual identifier 264 with the matched name entry and then identify the matched node entry by following the pointer included in the matched name entry.

Based on information included in the matched node entry 252, binding application 390 identifies a numeric identifier 450 associated with the matched node entry. In particular embodiments, node entries 252 contain a numeric identifier field, and numeric identifier 450 represents the value of the numeric identifier field of the matched node entry. Binding application 390 may then return numeric identifier 450 to generic encoder 30. For example, in response to receiving the binding request for the textual identifier 264 (in this case, "TITLE) of node 90b, binding application transmits a response that specifies the numeric identifier 450 (in this case, "40") associated with that textual identifier.

Generic encoder 20 then generates an encoded node 460 that replaces textual identifier 264 with numeric identifier 450 associated with that data node 90. Generic encoder 30 continues parsing the contents of data node 90 and may add parsed information from data node 90 to encoded node 460. If generic encoder 20 parses textual start delimiters 410 identifying the start of children nodes of data node 90, generic encoder 30 repeats this process for the children nodes.

Additionally, in particular embodiments, node entries 252 in node array identify other node entries 252, if any, that are associated with children of that node entry 252. In such embodiments, binding application 390 may maintain state information pertaining to the parsing being completed by generic encoder 30. In particular, binding application 390 may maintain information identifying the node entry 252 associated with the data node 90 currently being parsed. In such embodiments, when attempting to match textual identifiers 264 in subsequently-received binding requests to node entries 252 in node array 250, binding application 390 may assume that textual identifier 264 is associated with a child of the data node 90 currently being processed and attempt to match textual identifier 264 with only those node entries 252 associated with children of the previously matched node entry 252.

Furthermore, when generic encoder 30 parses a textual end delimiter 420 identifying the end of data node 90b or any children nodes of data node 90b, generic encoder 30 may complete binding of data node 90b by transmitting another binding request that identifies data node 90 by a textual identifier 264, such as an XML tag, included in the textual end delimiter 420. In particular embodiments, generic encoder 20 executes the binding request using another Java method, endElement( ), supported by binding application 390. This methods accept as a parameter textual identifiers 264 of data nodes 90 representing XML elements and attributes and may return a numeric identifier 450 for a particular definition node 210 associated with that textual identifier 264 in compiled schema 85. For example, using the example data document 70 illustrated in FIG. 3A, when generic encoder 30 encounters the textual start delimiter "<TITLE>" of data node 90b in FIG. 4A, generic encoder 30 may finish the binding of data node 90b by invoking the endElement( ) method as follows:

endElement("TITLE")

Using similar techniques to those described above with respect to binding requests generated using the startElement method, binding application 390 may attempt to match the textual identifier 264 included in such a binding request with a node entry in the node array 250. In particular embodiments, binding application 390 may maintain state information associated with the parsing performed by generic encoder 30. In such embodiments, binding application 390 may, when receiving a binding request using the endElement( ) method, attempt to only match textual identifier 264 from that binding request to a particular node entry 252 received as a result of the most recent invocation of startElement( ). After matching endElement( ) to a matched node entry, as described above, binding application 390 may return the numeric identifier 450 stored in the matched node entry. Alternatively, in embodiments of data processing system 10 in which binding application 390 maintains state information, generic encoder 30 may use the endElement( ) method solely to accurately indicate the scope of the data node 90 currently being processed. In such embodiments, binding application 390 may, in response to invocation of the endElement( ) update the state information to indicate that generic encoder 30 has reached the end of the data node 90 currently being processed and may then return a default value or no value at all.

Generic encoder 20 may also, while parsing data document data document 70, perform any appropriate additional steps to encode data nodes 90. For example, in particular embodiments, generic encoder 20 reduces the number of delimiters included in data documents 70. By making certain assumptions regarding the format of data documents 70 and by utilizing certain inherent redundancies in standard XML formats, generic encoder 20 may further reduce the size of encoded documents 72. In particular embodiments, generic encoder 20, after receiving numeric identifier 450 from binding application 390, generates an encoded node 460 from information in the relevant data node 90. In generating encoded node 460 from data node 90, generic encoder 20 may replace a textual start delimiter indicating the beginning of data node 90 with a numeric delimiter 470. Encoding module 450 may determine the value of numeric delimiter 470 based on a delimiter type associated with numeric delimiter 470, the numeric identifier 450 associated with data node 90, and/or predetermined delimiter values. In a particular embodiment, specific encoder 35 may access a delimiter value table 610 stored in memory 100 to obtain predetermined delimiter values. Delimiter value table 610 includes a plurality of delimiter values that specific encoder 35 uses to generate numeric delimiters 470. In the illustrated embodiment, these delimiter values include a base delimiter value 620, a delimiter limit value 630, an offset value 640, and a text delimiter value 660.

As one example of how generic encoder 30 may reduce the number of delimiters in encoded nodes 460, generic encoder 30 may eliminate unnecessary end delimiters in encoded nodes 460. Because XML and other markup languages may include end delimiters in situations where the end of the associated data node 90 can be assumed based on the content of that data node 90, such as at the end of an XML attribute or other simple-content element, generic encoder 20 may eliminate these unnecessary delimiters and further reduce the size of encoded nodes 460. More specifically, generic encoder 20 may determine whether, based on a node type of data node 90, to include a numeric delimiter 470 marking the end of data node 90. For example, encoded nodes 460 associated with XML attributes or simple-content elements may not include end delimiters. If generic encoder 20 decides, based on the node type of data node 90, to include a delimiter marking the end of encoded node 460, generic encoder 20 includes a second numeric delimiter 470 equal to base delimiter value 620, for example, −12 in this embodiment.

Generic encoder 20 may also combine adjacent end delimiters in data documents 70, such as those between a data node 90 and the last child node of that data node 90, such as textual start delimiter 410 and textual end delimiter 420 in FIG. 4A. More specifically, generic encoder 20 may generate a single numeric delimiter 470 for multiple textual end delimiters 420 with the relevant numeric delimiter 470 equal to base delimiter value 620 decremented once for each additional textual end delimiter 420 beyond the first to be consolidated into numeric delimiter 470. Thus, when generic encoder 20 combines two adjacent end delimiters, generic encoder 20 may replace the two textual end delimiters 420 with a single numeric delimiter 470, in this case, (−12−1), or −13. As a result, the value of numeric delimiter 470 in encoded node 460 reflects the fact that this numeric delimiter 470 marks the end of multiple encoded nodes 460.

Additionally, generic encoder 20 may also combine a textual end delimiter 420 and an adjacent textual start delimiter 410, such as textual end delimiter 420c and textual start delimiter 410d. More specifically, generic encoder 20 may consolidate a particular textual end delimiter 420 and an adjacent textual start delimiter 410 by generating a numeric delimiter 470 in encoded document 72 marking both the end of one encoded node 460 and the beginning of the next encoded node 460. The value used for such a numeric delimiter 470, in a particular embodiment, represents the sum of the numeric identifier 450 for the next encoded node 460 and an offset value 640.

In a particular embodiment, generic encoder 20 may be configured so that this offset value 640 is equal to the smallest integer value recognized by one or more components of data processing system 10. In the illustrated embodiment, this offset value equals $2^{-31}$. Thus, in the example, generic encoder 20 replaces textual end delimiter 420c and textual start delimiter 410d with a numeric delimiter 470 with a value equal to the sum of the numeric identifier 450 for data node 90 and the offset value, or $135+2^{-31}$.

In addition to reducing delimiters, generic encoder 20 may encode data nodes in any other suitable manner to reduce the size of encoded documents 72 or for any other appropriate reason. In a particular embodiment, generic encoder 20 converts all text data nodes 90 to byte sequences 490, such as 8-bit UTF-8 byte sequences. In general, generic encoder 20 may perform any additional encoding steps appropriate to data nodes 90 to generate encoded nodes 460. After completing the encoding, generic encoder 20 generates one or more encoded document 72 containing encoded nodes 460. Moreover, in a particular embodiment, data documents 70 represent XML documents containing XML elements composed entirely of tags and text elements. As a result, in such an embodiment, encoded document 72 may represent a series of UTF-8 byte sequences delimited by numeric delimiters 470. Generic encoder 30 may then transmit encoded documents 72 to document decoder 50, store encoded documents 72 in memory 100 accessible by both components, or make encoded documents 72 available for use by document decoder 50 in any other appropriate manner.

By replacing textual identifiers 264 with numeric identifiers 420 and eliminating particular delimiters, generic encoder 20 may reduce the amount of redundant information stored in data documents 70. As a result, generic encoder 20 may be able to further reduce the size of data documents 70 providing additional space-saving benefits. Additionally, generic encoder 20 may, in particular embodiments, perform certain additional encoding steps that encode data documents 70 in any other appropriate manner.

FIG. 4C illustrates an encoded document 72 generated by a particular embodiment of encoding module 382 from the example data document 70 shown in FIG. 4A. As shown, the example encoded document 72 include a series of decimal numeric delimiters 470 separating a plurality of text strings formatted as UTF-8 byte sequences. Additionally, the plurality of decimal numeric delimiters 470 and the plurality of byte sequences are separated from one another by commas. In general, however, numeric delimiters 470 and byte sequences 490 may be separated from each other by intervening commas, by intervening line breaks, or in any other suitable manner. Alternatively, encoded document 72 may represent a string of values that are output to another component as requested and encoded document 72 may include no separators between the various values.

The example embodiment of encoding module 382 that generates this encoded document 72 is assumed to utilize a end delimiter value of −12. Furthermore, encoding module 382 is assumed to form intermediate numeric delimiters 470 replacing adjacent textual end delimiters 420 and textual start delimiters 410 by adding the smallest numeric value recognized by encoding module 382, or $2^{-31}$, to numeric identifier 450 associated with the relevant data node 90. As used in FIG. 4C, the expression "UTF(xxx)" is intended to represent the byte sequence generated by converting the ASCII character string "xxx" to UTF-8 format.

FIGS. 5A-5B illustrate operation and contents of specific encoder 35 according to a particular embodiment. In particular embodiments, specific encoder 35 may support alternative or supplemental techniques for encoding data documents 70. When operating in conjunction with specific encoder 35, generating application 20 is configured to generate one or more pre-bound documents 78, an example of which is shown in FIG. 5A, whose nodes are already bound to compiled schema 85. Specific encoder 35 then encodes pre-bound document 78 and transmits pre-bound documents to a remote component for decoding, for example, by document decoder 50.

FIG. 5A illustrates an example of pre-bound document 78 generated by generating application 20b. In particular, generating application 20b generates pre-bound documents 78 that include pre-bound nodes 500. Pre-bound nodes 500 may include data similar to that included in data nodes 90 of data documents 70 generated by generating application 20a, but generating application 20b may omit some information that is redundant or otherwise unnecessary as a result of the fact that document decoder 50 also has access to compiled schema 85. As a result, specific encoder 35 may be able to encode pre-bound documents 78 faster than generic encoder 30 is able to encode data documents 70. Because generating application 20 may be limited to a particular compiled schema 85, however, specific encoder 35 may be less robust than generic encoder 30.

FIG. 5B illustrates operation of a particular embodiment of specific encoder 35 as specific encoder 35 encodes pre-bound documents 78. As discussed above with respect to FIG. 1, specific encoder 35 receives or otherwise accesses pre-bound documents 78 from generating application 20. Pre-bound documents 78 include pre-bound nodes 500 that are bound to compiled schema 85 when generating application 20 generates these nodes. Because both generating application 20 and document decoder 50 have access to compiled schema 85, generating application 20 can omit certain information from pre-bound nodes 500 and/or pre-bound documents 78 that is redundant or unnecessary in light of information provided by compiled schema 85. In a particular embodiment, generating application 20 generates pre-bound nodes 500 in a similar fashion to data nodes 90, but utilizes numeric identifiers 420, instead of textual identifiers, for each pre-bound node 500. In such an embodiment, document decoder 50 or other components of data processing system 10 may resolve the numeric identifiers 420 to determine the node type of the pre-bound node 500 and obtain more information about that pre-bound node 500 from compiled schema 85. Generating application 20 may also utilize the delimiter reducing techniques described above and/or other techniques designed to reduce the size of pre-bound nodes 500 or pre-bound documents 78.

After generating pre-bound document 78, generating application 20 transmits or provides pre-bound document 78 to specific encoder 30. Specific encoder 35 encodes pre-bound document 78 to generate encoded documents 72b. In a particular embodiment, specific encoder 35 may encode pre-bound document 78 in a manner similar to that described above for generic encoder 30 after generic encoder 30 has bound nodes 600. For example, specific encoder 35 may perform the delimiter reduction and/or the UTF-8 conversion described above for generic encoder 30. In particular embodiments, encoded documents 72b may be similar or identical to encoded documents 72a generated by specific encoder 35. More specifically, in particular embodiments, encoded document 72a may include a series of byte sequences 490 delimited by numeric delimiters 470 as illustrated. After encoding pre-bound document 78, specific encoder 35 generates one or more encoded documents 72b containing encoded nodes 460. Specific encoder 35 may then transmit encoded documents 72b to document decoder 50, store encoded documents 72b in memory 100 accessible by both components, or make encoded documents 72b available for use by document decoder 50 in any other appropriate manner.

Because generating application 20, under the described circumstances, is aware of compiled schema 85 and may be capable of limiting the duplication of certain information provided by compiled schema 85, such as textual identifiers 264 for names of data nodes 90, specific encoder 35 may be able to encode pre-bound documents 78 more quickly than generic encoder 30 can bind and encode data nodes 90. As a result, particular embodiments of generating application 20 and specific encoder 35 may provide additional speed benefits. Additionally, because pre-bound documents 78 may include less information than data documents 70, utilizing specific encoder 35 with a suitably configured generating application 20 may result in reduced outbound traffic from generating application 20.

Figure 6:
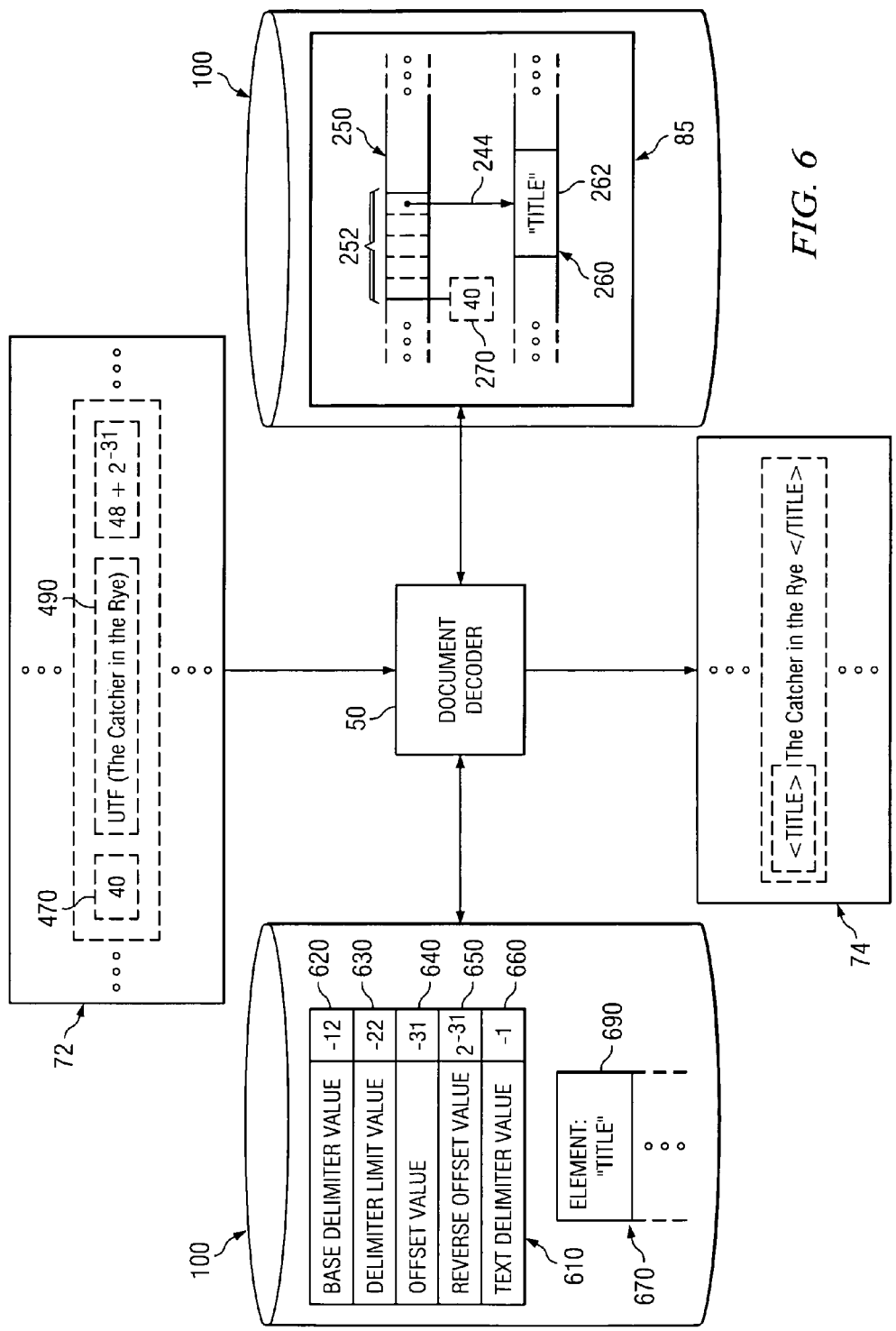
FIG. 6 illustrates operation of a document decoder according to a particular embodiment.

FIG. 6 illustrates operation and contents of document decoder 50 according to a particular embodiment. FIG. 6 illustrates operation of document decoder 50 according to a particular embodiment. Document decoder 50 receives encoded document 72 and, using compiled schema 85, decodes encoded nodes 460 included in encoded document 72. Document decoder 50 then transmits the decoded data nodes 90 to receiving application 50. Because document decoder 50 may be configured to utilize data definitions 210 included in compiled schema 85 during decoding, particular embodiments of document decoder 50 may facilitate the use of encoded documents 72 which provide substantially equivalent information as data documents 70 but are smaller in size. Additionally, because document decoder 50 may be configured to decode encoded document 72 that were encoded using the delimiter reducing techniques described above, particular embodiments of document decoder 50 may facilitate the use of more compact encoded documents 72.

In operation, document decoder 50 receives encoded document 72 from one or both of specific encoder 35 or generic encoder 30, referred to generically here as "document encoder 600." As noted above, encoded document 72 may represent a stream of values, one or more files, or data structured in any other suitable manner. In a particular embodiment, document decoder 50 receives encoded document 72 encoded according to the encoding techniques described above. As a result, encoded document 72 may represent a series of UTF-8 byte sequences 490 delimited by numeric delimiters 470, as shown in FIG. 4C. Although the description below focuses operation of document decoder 50 with respect to encoded document 72 of this type, document decoder 50 may be configured to utilize the described techniques on encoded documents 72 encoded in any suitable manner.

Furthermore, document decoder 50 may receive encoded document 72 from document encoder 600 over a network or other connectivity elements of document processing system 10. Moreover, document decoder 50 may receive encoded documents 72 directly from document encoder 600 or through one or more intervening components. Document decoder 50 may also receive encoded document 72 by retrieving encoded documents 72 from memory 100 accessible by both document encoder 600 and document decoder 50. In general, document decoder 50 may receive or obtain encoded documents 72 from document encoder 600 or another component of data processing system 10 in any appropriate manner.

Document decoder 50 begins parsing encoded document 72. As noted above, encoded document 72 may include encoded nodes 460 that are separated by numeric delimiters 470. Thus, while parsing encoded document 72, document decoder may read a numeric delimiter 470 from encoded document 72. Document decoder 50 then determines whether numeric delimiter 470 marks the beginning or end of one or more encoded nodes by comparing numeric delimiters 470 to one or more predetermined delimiter values. Data documents 70 may then, based on this determination, reconstruct markup data objects for transmission to receiving application 50 or otherwise provide receiving application 50 information describing the contents of a particular data node 90, such as by making attributes and other contents of that data node 90 available to receiving application 50 through an API of document decoder 50. In the illustrated embodiment, document decoder 50 stores data decoded from a particular encoded node 460 in a decode stack 670 in memory 100 until document decoder 50 has finished decoding that encoded node 460. Document decoder 50 then transmits a decoded data node 90 generated from that data to receiving application 50.

For example, document decoder 50 may, whenever document decoder 50 encounters a numeric delimiter 470 during parsing, determine the delimiter type of that numeric delimiter 470 by comparing numeric delimiter 470 to one or more predetermined values. In a particular embodiment, document decoder 50 may obtain predetermined values by accessing a delimiter value table 610 which includes a plurality of delimiter values that document decoder 50 uses to determine a delimiter type for numeric delimiters 470 read by document decoder 50. In the illustrated embodiment, these delimiter values include base delimiter value 620, delimiter limit value 630, a reverse offset value 650, and text delimiter value 660.

Document decoder 50 may first determine whether numeric delimiter 470 represents an end delimiter of a single encoded node 460. Document decoder 50 may determine whether numeric delimiter 470 represents an end delimiter by comparing numeric delimiter 470 to a base delimiter value 620. Document decoder 50 may obtain base delimiter value by accessing delimiter value table 610, as shown in FIG. 6, or may obtain base delimiter value 620 in any other appropriate manner. In a particular embodiment, document encoder 600 is configured to encode all end delimiters marking the end of a single data node 90 with a predetermined numeric delimiter 470 equal to base delimiter value 620. In a particular example embodiment, base delimiter value 620 equals "−12." Thus, if numeric delimiter 470 is equal to base delimiter value 620, document decoder 50 determines that numeric delimiter 470 represents the end of a single encoded node 460. Document decoder 50 may utilize this determination in any appropriate manner, based on the configuration of document decoder 50. For example, in a particular embodiment document decoder 50 may be adding decoded data from a particular encoded node 460 that document decoder 50 is currently decoding to a stack of data nodes 90. As a result of determining that numeric delimiter 470 represents the end of a single encoded node 460, document decoder 50 may pop the current data node from the top of the stack and transmit this data node 90 to receiving application 50. Document decoder 50 may then proceed with parsing the remainder of encoded document 72.

If the relevant numeric delimiter 470 does not represent an end delimiter of a single node, document decoder 50 may then determine whether numeric delimiter 470 represents an end delimiter marking the end of two or more nested encoded nodes 460. In a particular embodiment, document encoder 600 is configured to consolidate adjacent text delimiters marking the end of multiple nested data nodes 90 and to replace the adjacent text delimiters by a consolidated delimiter in encoded document 72. This consolidated delimiter represent a value equal to base delimiter value 620 decremented once for each data node 90 beyond a first that are terminated by the adjacent end delimiters. Furthermore, document encoder 600 may be configured to only consolidate a specified maximum number of adjacent end delimiters. Thus, in encoding nested end delimiters, document encoder 600 may decrement base delimiter value 620 only a maximum number of times to represent adjacent end delimiters. As a result, document decoder 50, in a particular embodiment, may determine that numeric delimiter 470 represents multiple nested end delimiter by determining that numeric delimiter 470 is less than base delimiter value 620 but greater than or equal to a delimiter limit value 630, with delimiter limit value 630 equal to base delimiter value 620 minus the maximum number of nested delimiters document encoder 600 is configured to consolidate.

For example, in a particular embodiment, document encoder 600 is configured to only consolidate a maximum of ten nested delimiters. As a result, delimiter limit value 620 equals "−22." Thus, in such an embodiment, document decoder 50 may determine that numeric delimiter 470 represents a consolidated delimiter marking the end of multiple nested encoded nodes 460 by determining that numeric delimiter 470 is less than "−12" but greater than or equal to "−22."

If document decoder 50 determines that numeric delimiter 470 represents marks the end of multiple encoded nodes 460, document decoder 50 may then utilize this determination in any appropriate manner. For example, in a particular embodiment, document decoder 50 may pop the current data node from the top of the stack and transmit this data node 90 to receiving application 50. Document decoder 50 may then increment numeric delimiter 470 and compare numeric delimiter 470 to base delimiter value 620 again. Document decoder 50 may then repeat this process until numeric delimiter 470 equals base delimiter value 620. Document decoder 50 may then proceed with parsing the remainder of encoded document 72.

If document decoder 50 determines that numeric delimiter 470 does not represent the end of one or more encoded nodes 460, document decoder 50 may determine whether numeric delimiter 470 represents the end of a first encoded node 460 and the beginning of a second adjacent encoded node 460. In a particular embodiment, document encoder 600 is configured to encode adjacent end and start delimiters marking, respectively the end of a first data node 90 and the beginning of a second adjacent data node 90 by replacing the adjacent end and start delimiters with an intermediate delimiter in encoded document 72, as described above. The value used for the intermediate delimiter, in a particular embodiment, represents the sum of a numeric identifier for the second node and an offset value 640.

In the illustrated embodiment, this offset value 640 equals the smallest integer value recognized by document decoder 50. In such an embodiment, document decoder 50 may be configured to utilize twos-complement arithmetic and, thus, adding the smallest integer value to any positive number will result in a negative integer value with a relatively large absolute value. Thus, document decoder 50, in such an embodiment, may determine that numeric delimiter 470 represents a consolidate delimiter marking the end of a first encoded node 460 and the beginning of an adjacent encoded node 460 by determining whether numeric delimiter 470 is less than delimiter limit value 630.

If document decoder 50 determines that numeric delimiter 470 represents the end of a first encoded node 460 and the beginning of a second adjacent encoded node 460, document decoder 50 may then utilize this determination in any appropriate manner. For example, in a particular embodiment, document decoder 50 may pop the current data node 90 from the top of the stack and transmit this data node 90 to receiving application 50. Document decoder 50 may then calculate a numeric delimiter 470 for a new data node 90 by adding a reverse offset value 650 to numeric delimiter 470. In a particular embodiment, reverse offset value 650 represents the largest negative integer value recognized by document decoder 50. In the illustrated embodiment, this reverse offset value 650 equals $2^{31}$. By adding reverse offset value 650 to numeric delimiter 470, document decoder 50 may be able to retrieve the original numeric delimiter 470 associated with the second encoded node 460. Document decoder 50 may then identify a definition node 210 associated with the original numeric delimiter 470 in compiled schema 85. document decoder 50 may then push a new data node 90 onto the top of decode stack 670. Document decoder 50 may then continue parsing encoded document 72 repeating this process above when document decoder 50 reads another numeric delimiter 470.

If document decoder 50 instead determines that numeric delimiter 470 is greater than base delimiter value 620, document decoder 50 may then determine whether numeric delimiter 470 marks the beginning of encoded text of a mixed-content data node 90. In a particular embodiment, document encoder 600 is configured to mark the beginning of text in mixed-content nodes with a delimiter equal to a text delimiter value 660. In the illustrated embodiment, text delimiter value 660 equals "−1." Thus, in such an embodiment, document decoder 50 may determine that numeric delimiter 470 marks the beginning of text from a mixed-content data node 90 by determining that numeric delimiter 470 is equal to text delimiter value 660.

If document decoder 50 determines that numeric delimiter 470 marks the beginning of encoded text, document decoder 50 may utilize this determination in any appropriate manner. In a particular embodiment, document decoder 50 begins reading data from encoded document 72 and decoding this data into characters. For example, document decoder 50 may read UTF-8 byte sequences and these byte sequences to ASCII text characters. Document decoder 50 may also transmit these characters to receiving application 50 or store the characters in decode stack 670 in the data node 90 that document decoder 50 is currently decoding. Document decoder 50 may then determine that document decoder 50 has read all the data associated with this text item and returns to parsing numeric delimiter 470. In a particular embodiment, document decoder 50 may determine that document decoder 50 has read all the text in this object by detecting a byte sequence of all zeros. After reading all the characters in the text item, document decoder 50 may return to parsing numeric delimiter 470.

Additionally, if document decoder 50 determines that numeric delimiter 470 is greater than base delimiter value 620 but that numeric delimiter 470 does not equal text delimiter value 660, document decoder 50 may determine that numeric delimiter 470 represents a start delimiter marking the beginning of an encoded node 460 that does not immediately follow the termination of a previous encoded node 460. In a particular embodiment, document encoder 600 is configured to encode a start delimiter that does not immediately follow an end delimiter by replacing such a start delimiter with a particular numeric delimiter 470 associated with the relevant data node 90, as described above with respect to FIG. 4B. Thus, in a particular embodiment, document decoder 50 may determine numeric delimiter 470 represents the beginning of an encoded node 460 if numeric delimiter 470 is greater than base delimiter value 620 and does not equal text delimiter value 660.

If document decoder 50 determines that numeric delimiter 470 marks the beginning of an encoded node 460, document decoder 50 may utilize this determination in any appropriate manner. In a particular embodiment, document decoder 50 may identify a node entry 252 associated with numeric delimiter 470 in node array 250 of compiled schema 85. Data documents 70 may then identify a particular name entry 262 name array 260 that is associated with the identified node entry 252 based on reference 244 in the identified node array 250.

Furthermore, if document decoder 50 determines based on the identified node entry 252 that encoded node 460 represents a data node 90 of a simple node type, document decoder 50 may then create a new data structure 690 containing information from name entry 262, such as a textual name 672 associated with a node type of the encoded node 460. Data structure 690 may represent an object, a record, a string, an array, or any other suitable collection of data. In a particular embodiment, data structure 690 includes one or more strings delimited by textual tags and represents a well-formed XML data structure.

Document decoder 50 may then transmit that data structure 690 to receiving application 50 or store data structure 690 for later use. If document decoder 50 determines based on the identified node entry 252 that encoded node 460 represents a data node 90 of a complex node type, document decoder 50 may then create data structure 690 containing information from name entry 262, such as textual name 672 associated with a node type of encoded node 460, and push the data structure 690 on decode stack 670. Document decoder 50 may then return to parsing encoded document 72.

Document decoder 50 may continue parsing encoded document 72 until document decoder 50 reaches the end of encoded document 72 repeating the comparisons described above as appropriate. Additionally, data documents 70 may execute any additional pre-processing or post-processing steps prior or subsequent to decoding encoded document 72 as described above. Moreover, document decoder 50 may also include any additional steps during the described processing as appropriate based on the characteristics of encoded document 72 and configuration of document decoder 50. Once document decoder 50 has completed parsing encoded document 72, data documents 70 may store decoded data nodes 90 in memory 100, transmit data nodes 90 to receiving application 50, notify receiving application 50 that document decoder 50 has completed decoding encoded document 72, and/or taking any other appropriate steps based on the configuration of data processing system 10. If alternatively document decoder 50 has been transmitting data nodes 90 to receiving application 50 during decoding, document decoder 50 may terminate without any further indication to receiving application 50.

Figure 7A:
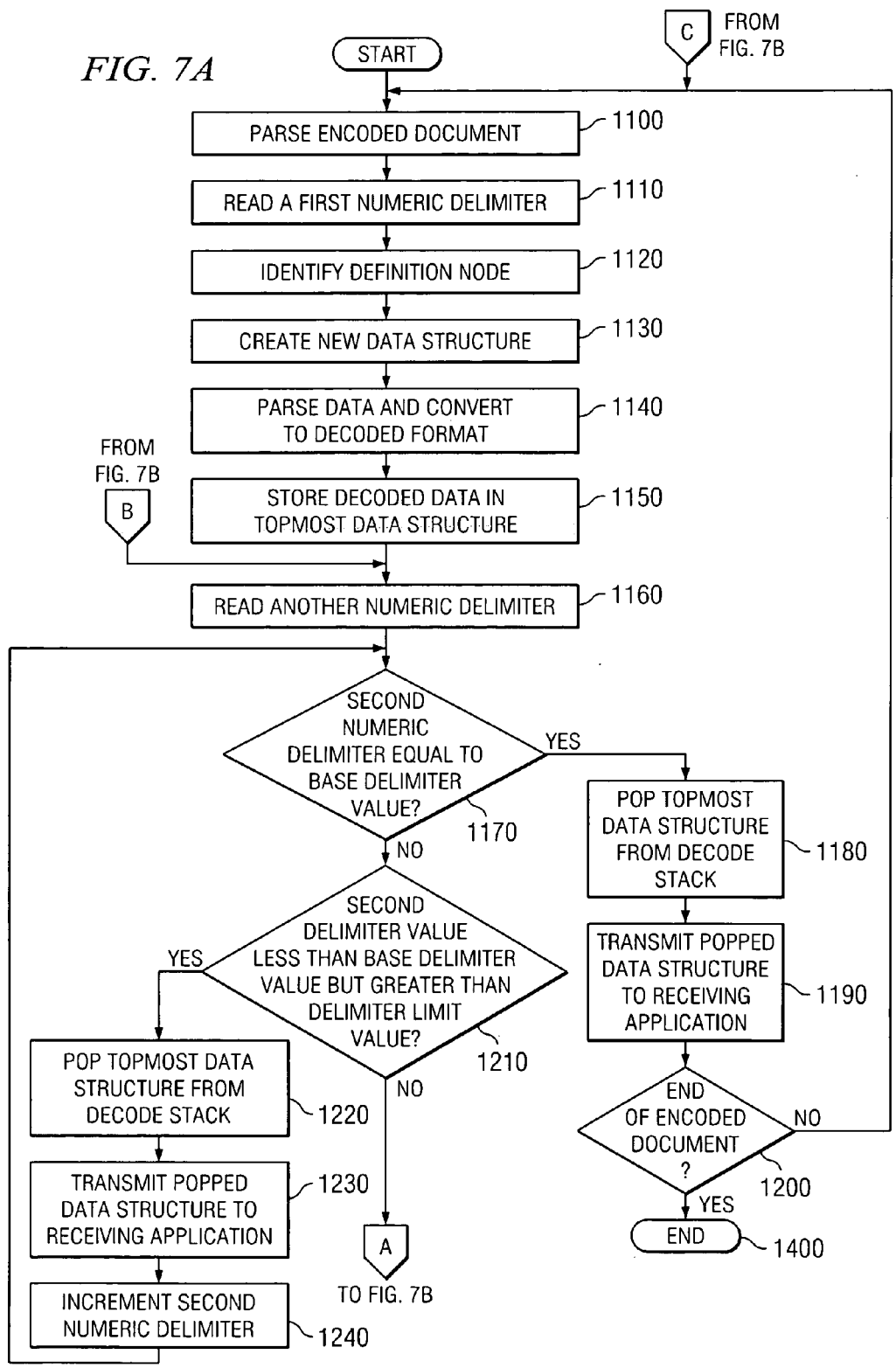
FIGS. 7A-7B are a flowchart detailing operation of the document decoder according to a particular embodiment.
Figure 7B:
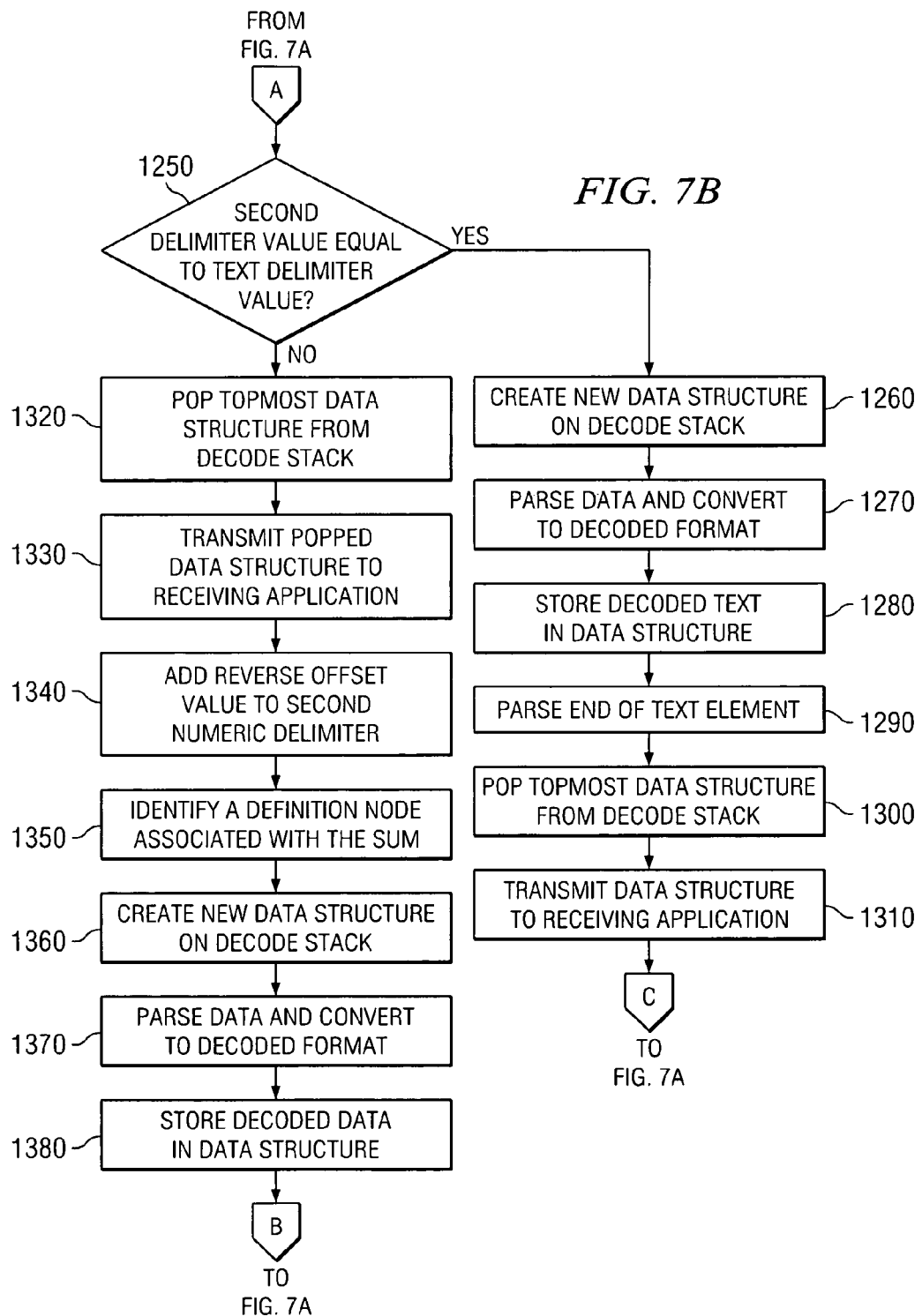

FIGS. 7A and 7B together form a flow chart detailing operation of document decoder 50 according to the embodiment illustrated in FIG. 6. At step 1100, document decoder 50 begins parsing encoded document 72. While parsing encoded document 72, document decoder 50 reads a first numeric delimiter 470 from encoded document 72 at step 1110. At step 1120, document decoder 50 identifies a definition node 210 in compiled schema 85 associated with first numeric delimiter 470. At step 1130, document decoder 50 creates a new data structure 690 on decode stack 670. Document decoder 50 may store textual identifier 264 associated with the identified definition node 210 in data structure 690. At step 1140, document decoder 50 continues parsing data following first numeric delimiter 470 in encoded document 72 and converts this data from an encoded format to a decoded format. For example, document decoder 50 may convert the data from UTF-8 byte sequences to ASCII characters. Document decoder 50 stores some or all of this decoded data in topmost data structure 690 at step 1150.

At step 1160, document decoder 50 reads a second numeric delimiter 470 from encoded document 72. Document decoder 50 then determines whether second numeric delimiter 470 marks the end of one or more encoded nodes 460. More specifically, document decoder 50 determines whether second numeric delimiter 470 is equal to base delimiter value 620 at step 1170. If second numeric delimiter 470 is equal to base delimiter value 620, second numeric delimiter 470 marks the end of a single encoded node 460. Thus, in response to determining that second numeric delimiter 470 equals base delimiter value 620, document decoder 50 may stop storing data from encoded document 72 in the topmost data structure 690 in decode stack 670 and/or pop the topmost data structure 690 from decode stack 670 at step 1180. Document decoder 50 may then transmit this topmost data structure 690 to receiving application 50 at step 1190. The completed data structure 690 may represent a markup-language data structure or information structured in any other appropriate manner.

Because, at this point, document decoder 50 is no longer parsing the contents of an encoded node 460, document decoder 50 may have reached the end of encoded document 72. Thus, at step 1200, document decoder 50 determines whether document decoder 50 has parsed to the end of encoded document 72. Document decoder 50 may determine that document decoder 50 has reached the end of encoded document 72 by parsing an end-of-file character, by detecting that no more data remains to be parsed in encoded document 72, or in any other suitable manner. If document decoder 50 determines that document decoder 50 has reached the end of encoded document 72, document decoder 50 may terminate decoding at step 1400. If document decoder 50 does not determine that document decoder 50 has reached the end of encoded document 72, document decoder 50 continues parsing encoded document 72, returning to step 1100.

If second numeric delimiter 470 is not equal to base delimiter value 620, document decoder 50 determines, at step 1210, whether second numeric delimiter 470 is less than base delimiter value 620 but greater than delimiter limit value 630. If second numeric delimiter 470 is less than base delimiter value 620 but greater than delimiter limit value 630, then second numeric delimiter 470 marks the end of multiple encoded nodes 460. Thus, in response to determining that second numeric delimiter 470 is less than base delimiter value 620 but greater than delimiter limit value 630, document decoder 50 may stop storing data from encoded document 72 in the topmost data structure 690 in decode stack 670 and/or pop the topmost data structure 690 from decode stack 670 at step 1220. Document decoder 50 may then transmit data structure 690 to receiving application 50 at step 1230. Document decoder 50 also increments second numeric delimiter 470 at step 1240. Document decoder 50 then returns to step 1170.

If second numeric delimiter 470 is not less than base delimiter value 620, document decoder 50 determines at step 1250 whether second numeric delimiter 470 is equal to text delimiter value 660. If second numeric delimiter 470 is equal to text delimiter value 660, second numeric delimiter 470 marks the beginning of a text element. In response to determining that second numeric delimiter 470 is equal to text delimiter value 660, document decoder 50 creates a new data structure 690 on decode stack 670 at step 1260. At step 1270, document decoder 50 continues parsing data following second numeric delimiter 470 in encoded document 72 and converts this data from an encoded format to a decoded format. Document decoder 50 stores some or all of this decoded data in data structure 690 at step 1280. Document decoder 50 continues parsing data from the encoded text element until document decoder 50 determines, at step 1290, that document decoder 50 has reached the end of the encoded text element. Document decoder 50 may determine document decoder 50 has reached the end of the encoded text element by utilizing a size specified in the encoded text element, by detecting a predetermined character or character pattern indicating the end of the encoded text, or in any other suitable manner. After detecting the end of the encoded text element, document decoder 50 may stop storing data from encoded document 72 in the topmost data structure 690 in decode stack 670 and/or pop the topmost data structure 690 from decode stack 670 at step 1300. Document decoder 50 may then transmit data structure 690 to receiving application 50 at step 1310. Document decoder 50 then continues parsing encoded document 72, returning to step 1130.

If second numeric delimiter 470 is less than both base delimiter value 620 and delimiter limit value 630, then second numeric delimiter 470 marks the end of a first encoded node 460 and the beginning of a second encoded node 460. As a result, document decoder 50 may stop storing data from encoded document 72 in the topmost data structure 690 in decode stack 670 and/or pop the topmost data structure 690 from decode stack 670 at step 1320. Document decoder 50 may then transmit this topmost data structure 690 to receiving application 50 at step 1330.

Additionally, in such a case, second numeric delimiter 470 may represent the sum of a numeric identifier 450 associated with the second encoded node 460. Because the illustrated embodiment of document decoder 50 uses twos-complement computational techniques, document decoder 50 may obtain the numeric identifier 450 by adding a reverse offset value 650 to second numeric delimiter 470. Thus, at step 1340, document decoder 50 adds reverse offset value 650 to second numeric delimiter 470 to obtain numeric identifier 450. Document decoder 50 then identifies a definition node 210 in compiled schema 85 associated with this numeric identifier 450 at step 1350. At step 1360, document decoder 50 creates a new data structure 690 on decode stack 670. Document decoder 50 may store textual identifier 264 from the identified definition node 210 in data structure 690. At step 1370, document decoder 50 continues parsing data following second numeric delimiter 470 in encoded document 72 and converts this data from an encoded format to a decoded format. Document decoder 50 stores some or all of this decoded data in data structure 690 at step 1380. Document decoder 50 then returns to step 1160.

Although not necessarily shown by any flow in FIGS. 7A-7B, document decoder 50 may, at any appropriate time, while parsing data from encoded document 72, document decoder 50 may determine, based on any suitable criteria that document decoder 50 has reached the end of encoded document 72. For example, document decoder 50 may detect an end delimiter for the bottommost data structure 690 on decode stack 670. Alternatively, document decoder 50 may detect a predetermined character or pattern of characters that marks the end of encoded document 72. In general, however, document decoder 50 may determine that document decoder 50 has reached the end of encoded document 72 in any suitable manner. Upon determining at step 1400, that document decoder 50 has reached the end of encoded document 72, document decoder 50 may remove any remaining data structures 690 from decode stack 670, transmit such data structures 690 to receiving application 50, and/or take any other appropriate steps to complete decoding of encoded document 72. Document decoder 50 completes decoding at step 1400.

Figure 8A:
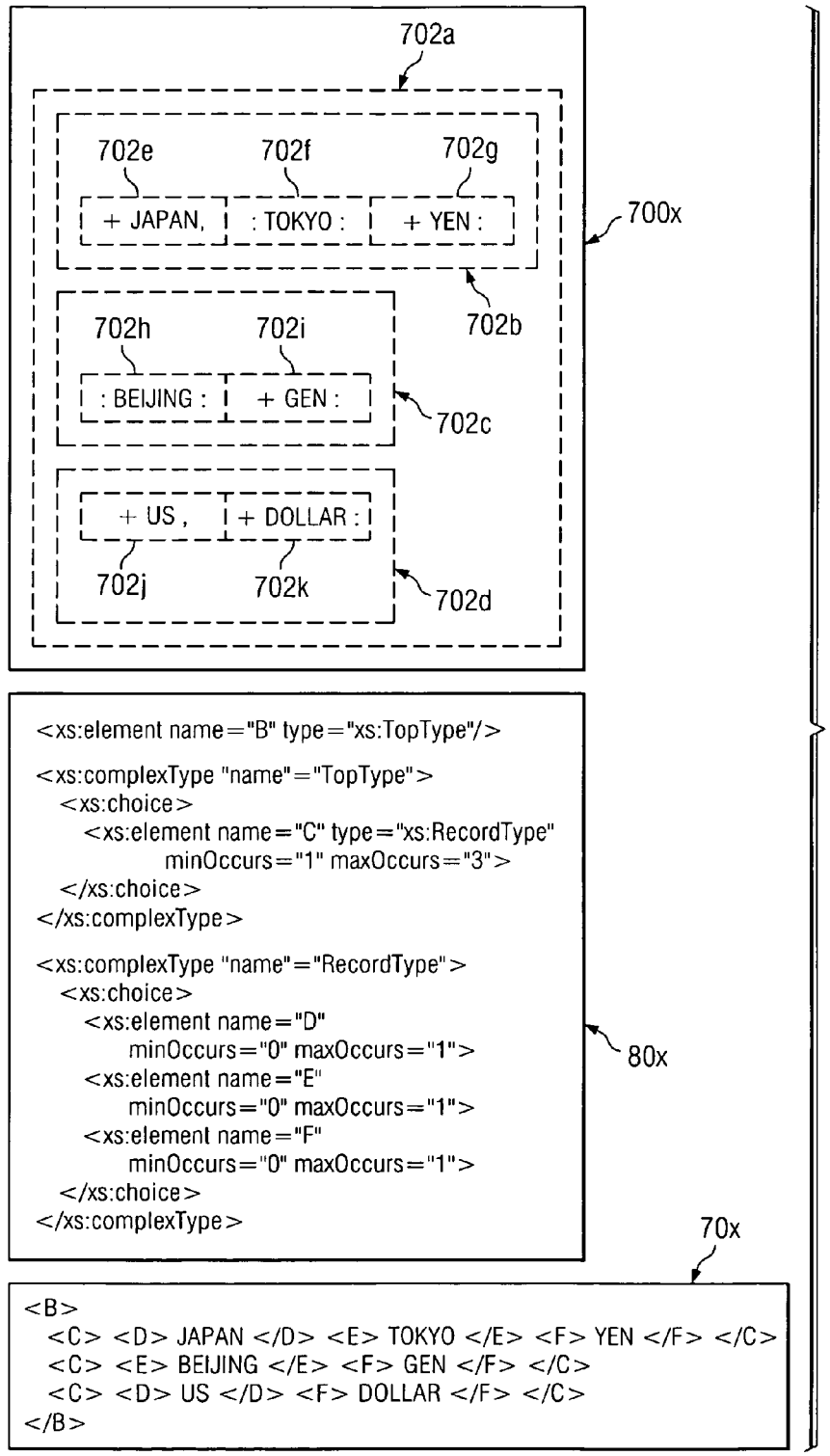
FIGS. 8A-8B illustrates an example operation of the document decoder in decoding an unbound document.
Figure 8B:
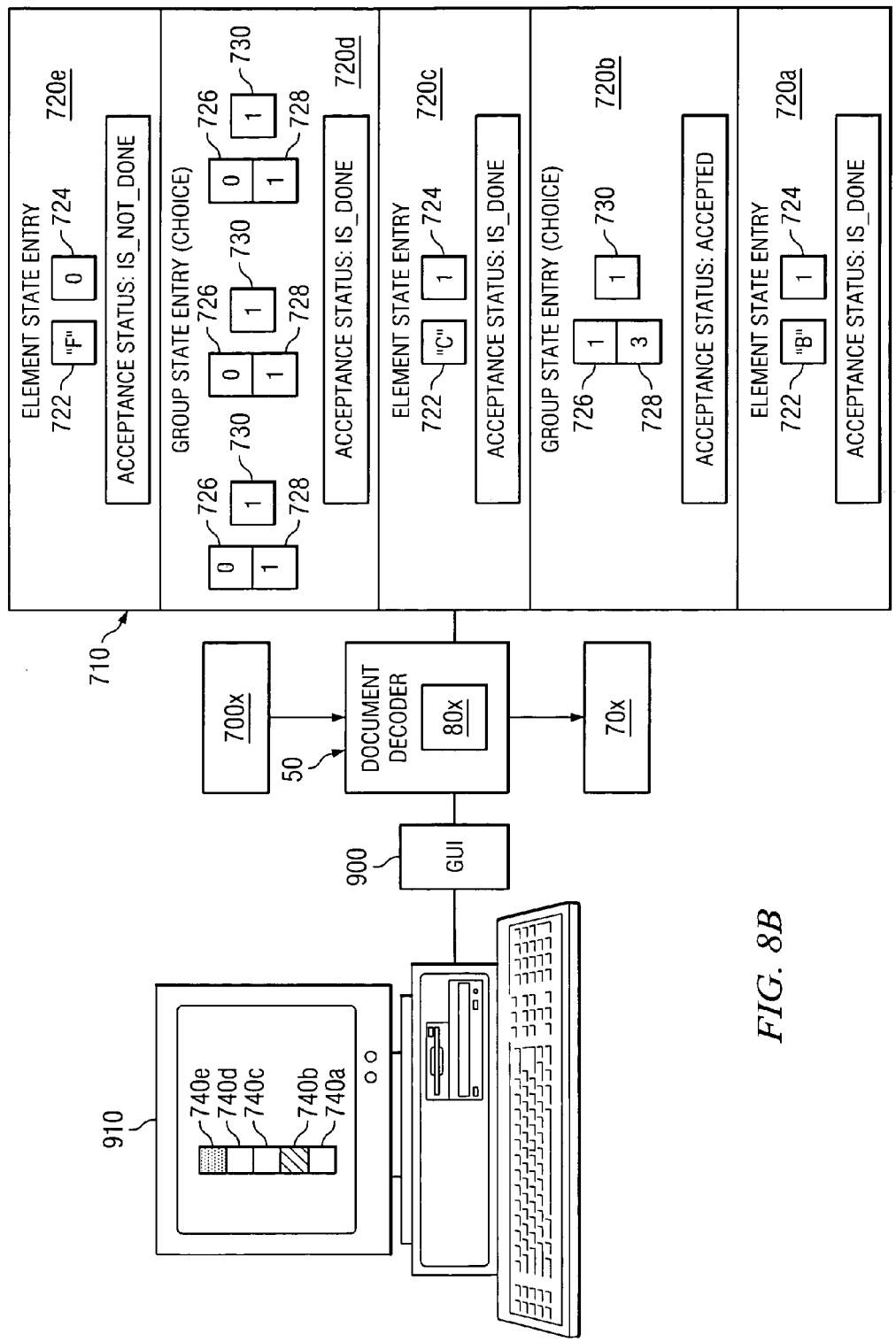

FIGS. 8A-8B illustrate alternative decoding techniques supported by particular embodiments of document decoder 50. Document decoder 50 may, under certain circumstances, receive data documents for receiving application 60 that have not been bound to compiled schema 85. As a result, particular embodiments of document decoder 50 may be configured to decode unbound documents 700 that include a hierarchy of nodes referred to as unbound nodes 702, that are structured in accordance with a particular schema or other form of data definition but not bound to a compiled schema 95 in the manner described above. Using a document state stack 710, document decoder 50 may be able to track a current location of document decoder 50 within the hierarchical tree of nodes, referred to as unbound nodes 702, in unbound document 700. As a result, particular embodiments of document decoder 50 may provide greater flexibility in the decoding of documents to be used by receiving application 60.

FIG. 8A illustrates an example unbound document 700x that particular embodiments of document decoder 50 may be capable of decoding. Also shown in FIG. 8A is an uncompiled schema 80 that defines the constructs used in unbound document 700x in this example. Additionally, for the purposes of illustration, FIG. 8A includes an example data document 70x the includes the same XML constructs as unbound document 700x but formatted according to conventional XML rules.

Unbound documents 700 may, in general, represent any documents describing data nodes 90 defined by a data definition of data processing system 10, such as uncompiled schema 80. As one example, unbound documents 700 may represent standard XML data documents that have not been encoded. Unbound documents 700 may also represent structured data documents that are not formatted and/or delimited in accordance with a markup language in a manner that would allow the hierarchy of unbound nodes 702 to be identified based on the delimiters of that unbound document 700. For example, particular embodiments of document decoder 50 may receive unbound documents 700 formatted as comma-separated value ("CSV") files that include data nodes 90, such as the example unbound document 700x shown in FIG. 8A. Also shown in FIG. 8A is an uncompiled schema 80x defining the constructs used in unbound document 700x and a data document 70x that, for the purposes of this description is assumed to an example data document 70 showing how the information in unbound document 700x might be structured in XML.

In the example, unbound document 700x includes a plurality of unbound nodes 702 representing element instances. Additionally, although not labeled in FIG. 8A, unbound document 700x may also include a number of unbound nodes representing group nodes and/or other types of unbound nodes. For example, unbound document 700x includes a group node formed by the instances of element "D", element "E", and element "F" that collectively make up the first instance of element "C" in unbound document 700x.

Although FIG. 8A illustrates a particular example of unbound document 700x, for use with particular embodiments of document decoder 50, in which unbound nodes 702 are delimited by a combination of symbols and line breaks, alternative embodiments of document decoder 50 may utilize unbound documents 700 that are delimited by any appropriate characters, symbols, whitespace, and/or other content. In general, unbound nodes 702 may be delimited according to any appropriate delimiting scheme, and document decoder 50 may utilize information in uncompiled schema 80 or information from other sources to determine the delimiter scheme associated with a particular unbound document 700. In this particular example, instances of element "B," for example unbound node 702a, implicitly start and end with new lines. Instances of element "C", for example unbound nodes 702b-d, also start and end with a new line. Instances of element "D," for example unbound nodes 702e and 702j, begin with "+" and end with ",". Instances of element "E," for example 702f and 702h, start with ":" and end with ":". Instances of element "F," for example 702g, 702j, and 702k, start with "+" and end with ":".

FIG. 8B illustrates operation of document decoder 50 in decoding unbound documents 700. In particular, FIG. 8B illustrates operation of document decoder 50 in decoding the example unbound document 700x shown in FIG. 8A, based on information included in compiled schema 85 that is also shown in FIG. 8A. As noted above with respect to FIG. 8A, although FIG. 8B illustrates operation of document decoder 50 in decoding a particular type of unbound document 700, document decoder 50 may be configured to decode any suitable type of unbound document 700 based on information in uncompiled schema 80 and/or any other appropriate source. In addition to document decoder 50, FIG. 8B allows includes a graphical user interface ("GUI") 900 and a document data stack 710.

GUI 900, as described in greater detail below, may be used by document decoder 50 to display information associated with the decoding of unbound documents 700. GUI 900 may represent any suitable user interface capable of generating a visual display based on information transmitted by document decoder 50. GUI 900 may include any appropriate combination of hardware and/or software. In the illustrated embodiment, GUI 900 represents a software process running on a processor and capable of outputting information to a computer monitor 910. In such an embodiment, document decoder 50 may represent a virtual machine with which GUI 900 communicates to receive updated status information associated with the decoding of unbound document 700x.

Document state stack 710 represents a data structure stored in memory 100 of data processing system 10. As shown in FIG. 8B, document decoder 50 includes or has access to document state stack 710. During parsing of unbound documents 700, document state stack 710 holds state entries 720 which may contain any information appropriate for document decoder 50 to track the current state of document decoding. Although document state stack 710 is described as a "stack," document state stack may represent any form of data structure suitable for storing state entries 720, as described below. In a particular embodiment, document state stack 710 represents a first-in-last-out ("FILO") stack.

In operation, document decoder 50 receives the example unbound document 700x from a remote component of data processing system 10 or acquires unbound document 700x in any other appropriate manner. As noted above, unbound document 700x includes a series of text values separated by symbols and line breaks. Document decoder 50 may use the example uncompiled schema 80 to convert unbound document 700x into a data document 70 conforming to XML or another language supported by receiving application 60.

More specifically, after acquiring unbound document 700x, document decoder 50 begins parsing unbound document 700x. Based on the delimiting scheme associated with unbound document 700x, document decoder 50 identifies the start of a first data node in unbound document 700x. For example, document decoder 50 may determine that the first character in the first line, the first character after the first newline character, or the first character following a particular delimiter marks the beginning of the first unbound node 702 in unbound document 700x. In general, document decoder 50 may, depending on the format of a particular unbound document 700, identify the beginning of the first data node in unbound document 700 in any suitable manner. In the illustrated embodiment, document decoder 50 identifies the first character of the first line as the beginning of the first unbound node 702a of unbound document 700x. As a result of identifying the beginning of first unbound node 702a of unbound document 700x, document decoder 50 adds a first state entry 720a to document state stack 710. In the illustrated embodiment, document state stack 710 represents a FILO stack and document decoder 50 pushes first state entry 720a onto one end, referred to here as the "top", of document state stack 710.

In particular embodiments, the contents of the state entry 720 document decoder 50 creates for a particular unbound node 702 may depend on a node type of that node. Document decoder 50 may determine the node type of the relevant node 702 based on the uncompiled schema 80 associated with unbound document 700x. In particular embodiments, document decoder 50 may create an element state entry 720, group state entry 720, and/or other type of state entry based on the node type of the relevant node 702. If the relevant unbound node 702 represents an element node 702, document decoder 50 may create an element state entry 720 in document state stack 710. Element state entry 720 may include a textual identifier 722 associated with the relevant node 702 and a particle count 724 that indicates whether the substance of the relevant node 702 has been fully parsed.

If the relevant unbound node 702 represents a group node 702, document decoder 50 may create a group state entry 720 in document state stack 710. Group state entry 720 may include a minimum occurrence value 726 and a maximum occurrence value 728 that together describe a number of children that an instance of that group must have before being considered well-formed and an occurrence. Moreover, if the relevant group node 702 is defined to include multiple types of children nodes, the group state entry 720 may include multiple minimum occurrence values 726 and a maximum occurrence values 728, with a minimum occurrence value 726 and a maximum occurrence value 728 associated with each type of children nodes defined for that group node 702. Furthermore, when document decoder 50 identifies the beginning of another unbound node 702 in unbound document 700x, document decoder 50 may also determine, based on uncompiled schema 80, that the identified unbound node 702 represents the first element in a plurality of nested group nodes, document decoder 50 may add multiple group state entries 720 to document state stack 710, one for each of the nested group nodes.

After pushing the state entry 720 on document state stack 710, document decoder 50 continues parsing unbound document 700x. If document decoder 50 identifies another start delimiter or other suitable information identifying the beginning of another unbound node 702, document decoder 50 adds another element state entry 720 to the document state stack 710. In the illustrated embodiment, document decoder 50 adds another state entry 720 by pushing another state entry 720 on the top of document state stack 710.

If document decoder 50 identifies an end delimiter or other suitable information indicating the end of the current unbound node 702, document decoder 50 removes the topmost state entry 720 from document state stack 710. In the illustrated embodiment, document decoder 50 removes a state entry 720 from document state stack 710 by popping a state entry 720 off the top of document state stack 710. As a result, document decoder 50 may track the current state of document parsing by adding and removing state entries 720 from the document state stack 710.

Document decoder 50 may also take any other appropriate action as a result of determining that the end delimiter of the unbound node 702 has been parsed. For example, document decoder 50 may write parsed data associated with the unbound node to a file in XML format. As a result, document decoder 50 may output a data document 70 similar to data documents 70x shown in FIG. 8A as a result of decoding unbound document 700x.

Additionally, in particular embodiments, document decoder 50 may utilize a particle count 724, minimum occurrence value 726, maximum occurrence value 728, and or occurrence count 730 associated with the relevant unbound node 702 and/or children of that unbound node 702 to determine an acceptance status of that unbound node 702. The acceptance status indicates whether document decoder 50 has completed parsing that unbound node 702 and/or whether that unbound node 702 represents a well-formed object of the relevant markup language.

For example, as noted above, document decoder 50 may add a group state entry 720 when document decoder 50 parses a the beginning of an unbound node 702 defined to include a group. Group state entry 720 includes minimum occurrence value 726 and maximum occurrence value 728 that together describe a number of children that an instance of that group must have before being considered well-formed and an occurrence count 730 that indicates the current number of children that has been parsed for the instance. In the illustrated example, the "choice" group included in instances of element B, such as unbound node 702a, needs to contain at least one children instances of element "C" to be complete and should contain no more than three instances of element "C." Thus, when document decoder 50 encounters an instance of element "B" when parsing unbound document 700x, document decoder 50 may create a group state entry 722a that includes a minimum occurrence value 726 of "1" and a maximum occurrence value 728 that is "3."

Then, as document decoder 50 parses children nodes 702 of this "choice" group, document decoder 50 may increment occurrence count 730 each time document decoder 50 encounters another child of the group. Document decoder 50 may then determine an acceptance status of the group based on occurrence count 730 and minimum occurrence value 726 and/or maximum occurrence value 728 associated with that group. For example, in a particular embodiment, document decoder 50 determines one of three possible acceptance statuses of a particular group unbound node 702. If occurrence count 730 for a particular group state entry 722 is less than minimum occurrence value 726 for that group state entry 722, then document decoder 50 determines an acceptance status of "IS_NOT_DONE" for the group node associated with that group state entry 722. If the relevant occurrence count 730 is greater than or equal to minimum occurrence value 726, then document decoder 50 determines an acceptance status "ACCEPTED," meaning that document decoder 50 has found a sufficient number of children for the group node to be considered well-formed, but that the group node may still acceptably include more children. If occurrence count 730 is equal to maximum occurrence value 728, then document decoder 50 determine an acceptance status of "IS_DONE" indicating that the group node can not include any additional children and remain well-formed. Document decoder 50 may additionally store this acceptance status in the relevant group state entry 722 as an acceptance status field 736.

Once document decoder 50 determines that acceptance status of the topmost state entry 720 in document state stack 710 is "IS_DONE," document decoder 50 may remove that topmost state entry 720 from document state stack 710. Additionally, if, during parsing, document decoder 50 reaches an end delimiter for the data node associated with the topmost state entry 720 in document state stack 710 and that topmost state entry currently has an acceptance status of "ACCEPTED", document decoder 50 may determine that the unbound node 702 associated with that state entry is complete and remove the topmost state entry from document state stack 710. Furthermore, in particular embodiments, document decoder 50 may initiate warning or error-correcting operations if an unexpected combination of acceptance status and parsing results occurs. For example, if document decoder 50 determines that an acceptance status for a particular group unbound node 702 has reached "IS_DONE" and then document decoder 50 parses another child for that group unbound node 702, document decoder 50 may generate a warning indicating that the unbound node 702 in question is not well-formed.

As noted above, FIG. 8B shows the contents of document state stack 710 immediately after document decoder 50 parses the start delimiter, "+", of node 702g. Because document decoder 50 has now detected the maximum number of each type of child possible for instances of element "C" (one each of elements "D," "E," and "F") document decoder 50 determines that the group node associated with the instance of element "C" represented by node 702b should not include any more children and the acceptance status of group state entry 220d becomes "IS_DONE." By contrast, document decoder 50 has only detected one instance of element "C" within the instance of element "B" represented by node 702a. While this total is greater than or equal to minimum occurrence value 726 for group state entry 220b, it is also less than maximum occurrence value 728 for group state entry 220b. Thus, document decoder 50 has detected a sufficient number of children for the instance of element "B," but the instance may still hold more children in accordance with the definition in uncompiled schema 80x. As a result, the acceptance status becomes "ACCEPTED."

Additionally, because document decoder 50 has parsed content substance for the instances of element "B" and "C" associated with unbound nodes 702a and 702b, the particle count 724 for these two element state entries 720 equals "1." The acceptance status of these element state entries is "IS_DONE" as, although document decoder 50 may continue to parse the existing particles of content no additional particles of content are expected. By contrast, document decoder 50 has only parsed the start delimiter of unbound node 702g and no content of node 702g. As a result, the particle count of the associated element state entry 720 is "0" and the acceptance status is "IS_NOT_DONE," as shown in FIG. 8B.

In addition to updating document state stack 710, document decoder 50 may also, in particular embodiments, display information associated with the acceptance status of particular state entries 720 or 722 and/or the associated nodes 702 on GUI 900. In particular embodiments document decoder 50 may indicate the acceptance status of the state entries by generating a status indicator 740 for each state entry 720 currently and/or previously stored in document state stack 710 and transmitting these status indicators 740 to GUI 900 for display on GUI 900. Document decoder 50 may update or replace the status indicators 740 displayed on GUI 900 as the status of individual state entries 720 changes.

Furthermore, document decoder 50 may use status indicators 740 to indicate the acceptance status of the associated state entry 720 in any appropriate manner. For example, in particular embodiments, document decoder 50 may indicate the acceptance status of a particular state entry by generating a status indicator 740 of a particular color for that state entry. Document decoder 50 may then indicate changes in the acceptance status of that state entry by changing the color of the associated status indicator 740 or by generating a new status indicator 740 with a different color. FIG. 8B illustrates an embodiment of data processing system 10 in which document decoder 50 indicates an acceptance status of "IS_NOT_ DONE" with a red status indicator 740 (indicated in FIG. 8B by the shaded status indicator 740e associated with state entry 720e), an acceptance status of "ACCEPTED" with a yellow status indicator 740 (indicated in FIG. 8B by the cross-hatched status indicator 740b associated with state entry 720b), and an acceptance status of "IS_DONE" with a green status indicator 740 (indicated in FIG. 8B by the unshaded status indicators 740a, 740c, and 740d associated with state entries 720a, 720c, and 720d, respectively).

Additionally, in some embodiments, document decoder 50 may utilize the acceptance status of one or more unbound nodes 702 to determine an "effective acceptance" of a parent node of those unbound nodes 70. The effective acceptance may indicate whether the document decoder 50 has parsed the appropriate combination of accepted children nodes for a particular unbound node 702 and document decoder 50 may determine the effective acceptance of a particular unbound node 702 based on the acceptance status of its children nodes. As a result, document decoder 50 may use the effective acceptance of an unbound node to indicate the completeness of the node and all its children. While, in particular embodiments, the acceptance status of a particular node changes as a result of document decoder 50 detecting the beginning of an instance of a child of that particular node, the effective acceptance changes as a result of document decoder 50 detecting a completed child of that particular node. Thus, because the effective acceptance of a particular node reflects the completeness of hierarchical levels beneath that node, effective acceptance may give a more accurate indicator than the acceptance status of the completeness of the node.

For example, referring to the example unbound document 700x of FIG. 8A, document decoder 50 may determine an effective acceptance of unbound node 702a, an instance of element "B," based on the completeness of any required children nodes of unbound node 702a. For example, as shown in FIG. 8A, uncompiled schema 80x indicates that instances of element "B" have a minimum of two instances of element "C" and a maximum of three instances of element "C," document decoder 50 may determine an effective acceptance of the instance of element "B" based on the acceptance status of any children. In particular embodiments, document decoder 50 stores the effective acceptance or information describing the effective acceptance in an effective acceptance field (not shown) in the relevant state entry 720. Document decoder 50 may then update the effective acceptance field as document decoder 50 removes completed state entries 720 from document state stack 710. Additionally, document decoder 50 may use the effective acceptance in any appropriate manner during decoding of unbound documents 700. As one example, document decoder 50 may display the effective acceptance of each unbound node 702 to a user on GUI 900 as described above with respect to the acceptance status.

Furthermore, although this description focuses on the uses of acceptance status during decoding of unbound documents 700, the described techniques may also be used by document decoder 50 or other applications or components of data processing system 10 to determine the completeness of other types of documents during decoding or other forms of processing. Moreover, other application or components of data processing system 10 may utilize the described techniques while processing data documents 70 to establish the acceptance status of nodes being processed by those components. For example, in a particular embodiment of data processing system 10, generating application 20 may utilize these techniques while validating data documents 70 and GUI 900 may reflect whether nodes in those data documents 70 are well-formed based on the described techniques for determining the acceptance status of these nodes 702.

Although the above description focuses, for the purposes of illustration, on an embodiment in which document decoder 50 utilizes the described techniques for determining an acceptance states or an effective acceptance, in alternative embodiments, any element of data processing system 10 may utilize these techniques. Furthermore, any element may interact with GUI 900 to provide GUI 900 with information pertaining to acceptance status and effective acceptance. In particular embodiments of data processing system 10, a virtual machine that functions as binding module 390 also supports the described techniques and, in addition to providing the binding functionality described above with respect to FIG. 4B, may also provides acceptance status and effective acceptance information to GUI 900.

As a result, both acceptance status and effective acceptance may be used to provide useful information to elements of data processing system 10 and/or using during decoding or other stages of operation. Additionally, in particular embodiments, acceptance status and effective acceptance may facilitate the processing of documents that utilize non-standard XML delimiting. As a result, the described techniques may provide a number of operational benefits.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of parsing a markup-language document, comprising:
    detecting, in a markup-language document, a start of a first data node of a first node type;
    identifying a first data definition associated with the first node type, wherein the first data definition specifies defined contents of the first node type;
    adding a first entry associated with the first data node to a data structure;
    reading, from the markup-language document, contents of the first data node;
    determining a status of the first data node based on the first data definition and the contents read from the first data node; and
    indicating the status of the first data node on a graphical user interface ("GUI").

2. The method of claim 1, wherein determining the status of the first data node comprises determining an acceptance status of the first data node wherein the acceptance status indicates whether one or more of the defined contents of the first data definition have been read from the first data node, and wherein indicating the status comprises indicating the acceptance status of the first data node GUI.

3. The method of claim 1, further comprising:
    reading, from the markup-language document, additional contents of the first data node;
    determining an updated status of the first data node based on the first data definition and the additional contents; and
    indicating the updated status of the first data node on the GUI.

4. The method of claim 3, wherein indicating the updated status comprises changing a color associated with text indicating the status of the first data node on the GUI.

5. The method of claim 1, wherein reading contents of the first data node comprises:
    identifying a start of a second data node within the first data node, wherein the second data node is a child node of the first data node;
    incrementing an occurrence count associated with child nodes of the first data node; and
    reading, from the markup-language document, contents of the second data node; and wherein determining the status of the first data node further comprises determining the status of the first data node based on the occurrence count.

6. The method of claim 5, wherein the second data node has a second node type and further comprising:
    identifying a second data definition associated with the second node type, wherein the second data definition specifies defined contents of the first node type;
    reading, from the markup-language document, contents of the second data node; and
    determining an acceptance status of the second data node based on the second data definition, wherein the acceptance status of the second node indicates whether one or more of the defined contents of the second data definition have been read from the second data node; and wherein determining the status of the first data node comprises determining an effective acceptance of the first data node based on the acceptance status of one or more child nodes of the first data node.

7. The method of claim 6, further comprising:
    reading, from the markup-language document, additional contents of one of the first data node and the second data node;
    determining an updated effective acceptance of the first data node based on the first data definition and the additional contents; and
    indicating the updated effective acceptance of the first data node on the GUI.

8. The method of claim 7, wherein indicating the updated effective acceptance comprises changing a color associated with text indicating the effective acceptance on the GUI.

9. An article of manufacture comprising:
    a non-transitory computer readable medium; and
    computer-executable instructions carried on the non-transitory computer readable medium, the instructions readable by a processor, the instructions, when read and executed, for causing the processor to:
        detect, in a markup-language document, a start of a first data node of a first node type;
        identify a first data definition associated with the first node type, wherein the first data definition specifies defined contents of the first node type;
        add a first entry associated with the first data node to a data structure; read, from the markup-language document, contents of the first data node;
        determine a status of the first data node based on the first data definition and the contents read from the first data node; and
        indicate the status of the first data node on a graphical user interface ("GUI").

10. The article of claim 9, wherein determining the status of the first data node comprises determining an acceptance status of the first data node, wherein the acceptance status indicates whether one or more of the defined contents of the first data definition have been read from the first data node, and wherein the logic is operable to indicate the status by indicating the acceptance status of the first data node.

11. The article of claim 9, the instructions, when read and executed, further causing the processor to:
    read, from the markup-language document, additional contents of the first data node;
    determine an updated status of the first data node based on the first data definition and the additional contents; and
    indicate the updated status of the first data node on the GUI.

12. The article of claim 11, the instructions, when read and executed, further causing the processor to indicate the updated status by changing a color associated with text indicating the status of the first data node on the GUI.

13. The article of claim 9, wherein the contents of the first data node are read by:
    identifying a start of a second data node within the first data node, wherein the second data node is a child node of the first data node;
    incrementing an occurrence count associated with child nodes of the first data node; and
    reading, from the markup-language document, contents of the second data node; and wherein determining the status of the first data node further comprises determining the status of the first data node based on the occurrence count.

14. The article of claim 13, wherein the second data node has a second node type and the instructions, when read and executed, further causing the processor to:
   identify a second data definition associated with the second node type, wherein the second data definition specifies defined contents of the first node type;
   read, from the markup-language document, contents of the second data node; and
   determine an acceptance status of the second data node based on the second data definition, wherein the acceptance status of the second node indicates whether one or more of the defined contents of the second data definition have been read from the second data node; and wherein determining the status of the first data node comprises determining an effective acceptance of the first data node based on the acceptance status of one or more child nodes of the first data node.

15. The article of claim 14, the instructions, when read and executed, further causing the processor to:
   read, from the markup-language document, additional contents of one of the first data node and the second data node;
   determine an updated effective acceptance of the first data node based on the first data definition and the additional contents; and
   indicate the updated effective acceptance of the first data node on the GUI.

16. The article of claim 15, the instructions, when read and executed, further causing the processor to indicate the updated effective acceptance by changing a color associated with text indicating the effective acceptance on the GUI.

17. A system for parsing a markup-language document, comprising:
   a memory operable to store markup-language documents;
   a graphical user interface ("GUI") operable to display a status of one or more data nodes based on information received from a processor; and
   the processor operable to:
      detect, in a markup-language document, a start of a first data node of a first node type;
      identify a first data definition associated with the first node type, wherein the first data definition specifies defined contents of the first node type;
      add a first entry associated with the first data node to a data structure;
      read, from the markup-language document, contents of the first data node;
      determine a status of the first data node based on the first data definition and the contents read from the first data node; and
      indicate the status of the first data node on the GUI.

18. The system of claim 17, wherein the processor is operable to determine the status of the first data node by determining an acceptance status of the first data node, wherein the acceptance status indicates whether one or more of the defined contents of the first data definition have been read from the first data node, and wherein the processor is operable to indicate the status by indicating the acceptance status of the first data node on the GUI.

19. The system of claim 17, the processor further operable to:
   read, from the markup-language document, additional contents of the first data node;
   determine an updated status of the first data node based on the first data definition and the additional contents; and
   indicate the updated status of the first data node on the GUI.

20. The system of claim 19, wherein the processor is further operable to indicate the updated status by changing a color associated with text indicating the status of the first data node on the GUI.

21. The system of claim 17, wherein the processor is operable to read contents of the first data node by:
   identifying a start of a second data node within the first data node, wherein the second data node is a child node of the first data node;
   incrementing an occurrence count associated with child nodes of the first data node; and
   reading, from the markup-language document, contents of the second data node; and wherein determining the status of the first data node further comprises determining the status of the first data node based on the occurrence count.

22. The system of claim 21, wherein the second data node has a second node type and wherein the processor is further operable to:
   identify a second data definition associated with the second node type, wherein the second data definition specifies defined contents of the first node type;
   read, from the markup-language document, contents of the second data node; and
   determine an acceptance status of the second data node based on the second data definition, wherein the acceptance status of the second node indicates whether one or more of the defined contents of the second data definition have been read from the second data node; and wherein determining the status of the first data node comprises determining an effective acceptance of the first data node based on the acceptance status of one or more child nodes of the first data node.

23. The system of claim 22, wherein the processor is further operable to:
   read, from the markup-language document, additional contents of one of the first data node and the second data node;
   determine an updated effective acceptance of the first data node based on the first data definition and the additional contents; and
   indicate the updated effective acceptance of the first data node on the GUI.

24. The system of claim 23, wherein the processor is operable to indicate the updated effective acceptance by changing a color associated with text indicating the effective acceptance on the GUI.

* * * * *